(12) United States Patent
Ogawa et al.

(10) Patent No.: US 7,827,542 B2
(45) Date of Patent: Nov. 2, 2010

(54) COMPILER APPARATUS

(75) Inventors: Hajime Ogawa, Osaka (JP); Ryoko Miyachi, Hyogo (JP); Toshiyuki Sakata, Osaka (JP)

(73) Assignee: Panasonic Corporation, Osaka (JP)

( * ) Notice: Subject to any disclaimer, the term of this patent is extended or adjusted under 35 U.S.C. 154(b) by 1073 days.

(21) Appl. No.: 11/534,719

(22) Filed: Sep. 25, 2006

(65) Prior Publication Data

US 2007/0074196 A1 Mar. 29, 2007

(30) Foreign Application Priority Data

Sep. 28, 2005 (JP) ............................... 2005-282852

(51) Int. Cl.
*G06F 9/45* (2006.01)
(52) U.S. Cl. ..................... 717/140; 717/150; 717/160
(58) Field of Classification Search .................. 717/140
See application file for complete search history.

(56) References Cited

U.S. PATENT DOCUMENTS

| | | | | | |
|---|---|---|---|---|---|
| 4,991,088 | A | * | 2/1991 | Kam | 717/160 |
| 5,202,995 | A | * | 4/1993 | O'Brien | 717/160 |
| 5,386,562 | A | * | 1/1995 | Jain et al. | 717/160 |
| 5,457,799 | A | * | 10/1995 | Srivastava | 717/160 |
| 5,815,721 | A | * | 9/1998 | Benitez | 717/160 |
| 5,966,539 | A | * | 10/1999 | Srivastava | 717/156 |
| 6,059,839 | A | * | 5/2000 | Dehnert et al. | 717/154 |
| 6,253,373 | B1 | * | 6/2001 | Peri | 717/150 |
| 2002/0133813 | A1 | * | 9/2002 | Ostanevich | 717/150 |
| 2002/0147969 | A1 | * | 10/2002 | Lethin et al. | 717/138 |
| 2003/0237080 | A1 | | 12/2003 | Thompson et al. | |
| 2005/0071607 | A1 | * | 3/2005 | Muthukumar | 712/227 |
| 2006/0048124 | A1 | | 3/2006 | Martin | |
| 2006/0107267 | A1 | | 5/2006 | Miyachi et al. | |

OTHER PUBLICATIONS

Tanaka, "Configuration and Optimization of Compiler," Asakura Shoten, Sep. 15, 1999, pp. 242-243 and 284-287, together with an English language translation of the same.
U.S. Appl. No. 11/420,059 to Michimoto et al., filed May 24, 2006.
Nakata, "Configuration and Optimization of Compiler," Asakura Shoten, Sep. 15, 1999, pp. 242-243 and 284-287, together with an English language translation of the same.

* cited by examiner

*Primary Examiner*—Thomas K Pham
(74) *Attorney, Agent, or Firm*—Greenblum & Bernstein P.L.C.

(57) ABSTRACT

A compiler apparatus that improves the performance of loop processing. The compiler apparatus translates a C program that includes a loop into a machine language program, and includes: a movement judgment unit that judges whether or not an instruction which is positioned outside of the loop of the C program can be moved into the loop, based on a state of live ranges of variables used in the instruction; a movement execution unit that moves the instruction into the loop in the case where the movement judgment unit judges that the instruction can be moved into the loop, thereby generating an intermediate program; and a translation unit that translates the intermediate program into the machine language program.

19 Claims, 30 Drawing Sheets

FIG. 5

```
...
p = x:
q = y:
a = 5000
for ( i = 0; i < 100; i++){
 s = *(p++) + a;
 t = s + 5;
 u = s + 7;
 *(q++) = t;
 *q(++) = u;
}
...
```

FIG. 7

```
        ...
        mov    r0, x
        mov    r1, y
        ;;
L00001:
        ld     r2, (r0+)
        ;;
        mov    r3, 5000
        ;;
        add    r3, r2, r3
        ;;
        add    r2, r3, 5
        inc    r4
        ;;
        st     (r1+), r2
        cmplt  C0, r4, 100
        add    r2, r3, 7
        ;;
        st     (r1+), r2
[C0]br         L00001
        ;;
        ...
```

FIG. 26A

```
        ...
        mov    r0, x
        mov    r1, y
        mov    r5, 5000 ─── 172
        ;;
L00001:
        ld     r2, (r0+)
        ;;
        add    r3, r2, r5 ─── 174
        ;;
        add    r2, r3, 5
        inc    r4
        ;;
        st     (r1+), r2
        cmplt  C0, r4, 100
        add    r2, r3, 7
        ;;
        st     (r1+), r2
[C0]br         L00001
        ;;
        ...
```

FIG. 26B

```
        ...
        mov    r0, x
        mov    r1, y

;;
L00001:
        ld     r2, (r0+)
        ;;
        mov    r3, 5000 ─── 178
        ;;
        add    r3, r2, r3 ─── 180
        ;;
        add    r2, r3, 5
        inc    r4
        ;;
        st     (r1+), r2
        cmplt  C0, r4, 100
        add    r2, r3, 7
        ;;
        st     (r1+), r2
[C0]br         L00001
        ;;
        ...
```

FIG. 27A

```
  mov  vr20, 5000
L00002:
  ...
  mov  vr10, x
  mov  vr11, y
L00001:
  ld   vr0, (vr10+)
  add  vr1, vr0, vr20
  add  vr2, vr1, 5
  add  vr3, vr1, 7
  st   (vr11+), vr2
  st   (vr11+), vr3
  inc  vr9
  cmplt C0, vr9, 100
[C0]br L00001
  ...
[C1]br L00002
```

FIG. 27B

```
L00002:
  ...
  mov  vr10, x
  mov  vr11, y
L00001:
  mov  vr20, 5000
  ld   vr0, (vr10+)
  add  vr1, vr0, vr20
  add  vr2, vr1, 5
  add  vr3, vr1, 7
  st   (vr11+), vr2
  st   (vr11+), vr3
  inc  vr9
  cmplt C0, vr9, 100
[C0]br L00001
  ...
[C1]br L00002
```

FIG. 28A

```
...
p = x;
q = y;
a = 5000
#pragma invariant_reverse
for ( i = 0; i < 100; i++){
  s = *(p++) + a;
  t = s + 5;
  u = s + 7;
  *(q++) = t;
  *q(++) = u;
}
...
```
200

FIG. 28B

```
...
p = x;
q = y;
a = 5000
#pragma invariant_reverse_off
for ( i = 0; i < 100; i++){
  s = *(p++) + a;
  t = s + 5;
  u = s + 7;
  *(q++) = t;
  *q(++) = u;
}
...
```
202

FIG. 28C

? cc test.c -invariant_reverse

? cc test.c -invariant_reverse_off

? cc test.c -low_power_mode

208

COMPILER APPARATUS

BACKGROUND OF THE INVENTION (1) Field of the Invention

The present invention relates to a compiler apparatus that translates a source program written in a high-level language to a program written in machine language, and particularly to a compiler apparatus that optimizes a loop.

(2) Description of the Related Art

Recently, application programs present in multimedia devices include many media processes requiring extremely fast processing. A great number of loops are included in such media processing, and these loops require a longer execution time as compared to other processes. As a result, the execution speed of these loops affects the execution speed of the media processing.

Therefore, in the compiler field, many loop optimization techniques exist for improving the execution speed of loops. "Optimization through loop invariant motion" is known as one of these technologies (for example, see Nakata, Ikuo, "Configuration and Optimization of Compilers," Asakura Shoten, Sep. 15, 1999; pp. 242-243 and 284-287).

Optimization through loop invariant motion is an optimization method in which instructions unrelated to the execution of each loop iteration are moved outside of the loop, thereby reducing the number of instructions within the loop.

For example, in the case where each iteration in the loop, defining the same value to the same register (for example, assigning the same value to the same register) alone is repeated, and the value of that register essentially does not change through the entire loop process, that instruction may be moved outside of the loop, thereby creating a situation in which the defined value is retained throughout the entire loop.

However, in order to retain a value defined by an instruction located outside of the loop throughout the entire loop process, a certain register must be appropriated throughout the entire loop. For example, an intermediate program 10 such as that shown in FIG. 1 (*a*) can be considered. Here, an instruction 10*a* (mov vr20, 5000) is an instruction that assigns a constant 5000 to a virtual register vr20, and an instruction 10*b* (add vr1, vr0, vr20) is a command that adds a value held in a virtual register vr0 to a value held in a virtual register vr20 and assigns the resultant to a virtual register vr1.

In other words, in the intermediate program 10, the virtual register vr20 is defined in the instruction 10*a*, and the virtual register vr20 is referred to in the instruction 10*b*; the virtual register vr20 must hold the value 5000 throughout the entire loop. Accordingly, when a value defined outside or the loop is only referred to within the loop, a register that holds the value defined outside of the loop throughout the entire loop is necessary.

FIG. 1 (*b*) shows an intermediate program 12 generated as a result of instruction scheduling on the intermediate program shown in FIG. 1 (*a*), in the case where the target processor is a processor that can execute three instructions in parallel. In addition, in FIG. 1 (*b*), a live range chart 14, which shows live ranges of the virtual registers used in the intermediate program 12, is shown along with the intermediate program 12. Here, "live range" indicates an area from where the virtual register is defined to where the virtual register is last referred to. As shown in the live range chart 14, the virtual register vr20 is live throughout the entire loop. From the live range chart 14, it can be seen that the maximum number of registers required by the intermediate program 12 is six.

When there are plural dependencies between definitions and references, such as dependencies between the instruction 10*a* and the instruction 10*b*, more registers are occupied throughout the entire loop, reducing the number of registers that can be used during the loop. Therefore, there is an increased chance that register spilling (temporarily transferring computational results to a memory due to insufficient registers) will occur. Even if register spilling does not occur, and a backup register is used within a certain function, code must be generated for saving/returning values held by the backup register at the beginning and end of that function to/from a stack.

In other words, performing loop invariant motion tends to exacerbate situations such as where register spilling occurs during the loop or code for saving/returning values held in a backup register to/from a stack is executed. Accordingly, there is a problem in that performance may be reduced due to register spilling being caused, or save/return code being executed, through the same loop invariant motion meant to improve the performance of the loop.

SUMMARY OF THE INVENTION

Having been conceived in light of the abovementioned problem, an object of the present invention is to provide a compiler apparatus that improves the performance of loop processing.

To achieve the abovementioned goal, a compiler apparatus of the present invention translates a first program that includes a loop into a second program, and includes: a movement judgment unit that judges whether or not an instruction which is positioned outside of the loop of the first program can be moved into the loop, based on a state of live ranges of variables used in the instruction; a movement execution unit that moves the instruction into the loop in the case where the movement judgment unit judges that the instruction can be moved into the loop, thereby generating an intermediate program; and a translation unit that translates the intermediate program into the second program.

According to this configuration, an instruction present outside of the loop can be moved into the loop. Therefore, unlike optimization through loop invariant motion, the length of the live range of the register can be shortened. Thus, there is the possibility that the number of registers necessary in the loop can be reduced. In other words, the number of registers usable when executing the loop can be increased at the time of loop execution, and thus the probability of register spilling occurring can be reduced. Moreover, the probability of using a backup register decreases, thus reducing the probability of executing code for saving/returning values held in the backup register to/from a stack. Therefore, the possibility of decreasing the performance of the loop by causing unnecessary register spilling or through the execution of save/return code is eliminated, and hence, the performance of the loop can be improved.

Specifically, the movement judgment unit judges that the instruction can be moved into the loop in the case where the number of registers necessary after moving the instruction is less than the number of registers necessary before moving the instruction. Moreover, the movement judgment unit may judge that the instruction can be moved into the loop in the case where the number of occurrences of register spilling after moving the instruction is less than the number of occurrences of register spilling before moving the instruction.

Preferably, the movement judgment unit further judges whether or not an instruction which is outside the loop, and which is data-dependent on an instruction judged to be movable into the loop, can be moved into the loop.

An instruction that is dependent on another instruction that was moved into the loop can be recursively judged to also be moved into the loop. Therefore, there is the possibility that the number of registers necessary in the loop can further be reduced, as compared to the abovementioned compiler apparatus. Thus, the performance of the loop can be further improved.

A compiler apparatus according to another aspect of the present invention translates a first program that includes a loop into a second program, and includes: a loop invariant motion unit that selectively optimizes an instruction positioned within the loop contained in the first program through loop invariant motion, in accordance with a state of live ranges of variables used by the instruction, and generate an intermediate program; and a translation unit that translates the intermediate program into the second program. Preferably, the loop invariant motion unit optimizes the instruction through loop invariant motion in the case where the number of registers necessary after the instruction is moved is less than the number of registers necessary before the instruction is moved.

It is possible to perform loop invariant motion only in cases where the necessary number of registers will decrease if loop invariant motion is performed. Thus, it is possible to improve the performance of the loop, in the same manner as with the abovementioned compiler apparatus.

Note that the present invention may be realized not only as a compiler apparatus that includes these characteristic units, but also as a compiling method which implements the characteristic units of the compiler apparatus as steps, as a compiler that causes a computer to execute the characteristic steps included in the compiling method, and so on. Furthermore, it goes without saying that such a program can be distributed via a storage medium such as a Compact Disc Read-Only Memory (CD-ROM), a communications network such as the Internet, and so on.

According to the present invention, a compiler apparatus that improves the performance of looping is provided.

FURTHER INFORMATION ABOUT TECHNICAL BACKGROUND TO THIS APPLICATION

The disclosure of Japanese Patent Application No. 2005-282852 filed on Sep. 28, 2005 including specification, drawings, and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing an example of a C program inputted to a compiler;

FIG. 7 is a diagram showing an assembly program corresponding to a machine language program generated by a compiler;

FIGS. 26A and 26B are diagrams showing a reduction in the number of registers as a result of an instruction being moved;

FIGS. 27A and 27B are diagrams describing movement judgment and movement execution processing of an instruction within a nested loop;

FIG. 28A is a diagram showing an example of a source program that includes a pragma "# pragma invariant_reverse" which directs a compiler to optimize a loop through instruction movement;

FIG. 28B is a diagram showing an example of a source program that includes a pragma "# pragma invariant_reverse_off" which directs a compiler not to optimize a loop through instruction movement;

FIG. 28C is a diagram showing a compile option "-invariant_reverse" which directs a compiler to optimize a loop through instruction movement;

FIG. 28D is a diagram showing a compile option "-invariant_reverse_off" which directs a compiler not to optimize a loop through instruction movement;

FIG. 28E is a diagram showing a compile option "-low_power_mode" which directs a compiler to generate a machine language program executable with a low amount of power consumption;

DESCRIPTION OF THE PREFERRED EMBODIMENT(S)

First Embodiment

Hereafter, a compiler according to the first embodiment of the present invention shall be described with reference to the diagrams.

Figure 2:
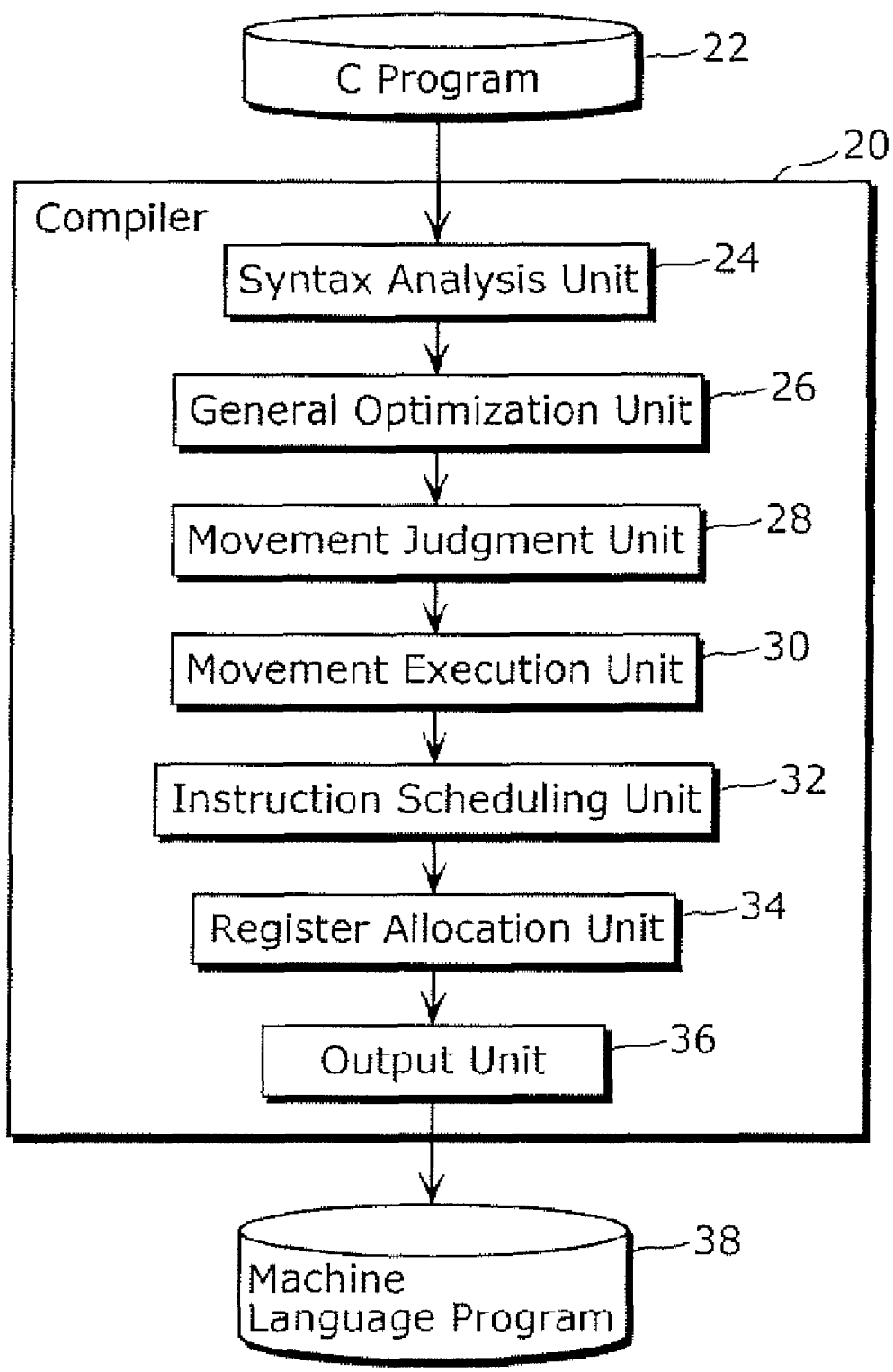
FIG. 2 is a block diagram that functionally shows a configuration of a compiler according to the first embodiment of the present invention.

FIG. 2 is a block diagram that functionally shows a configuration of the compiler. The compiler 20 is computer software, the target processor of which can execute three instructions in parallel, and which translates a source program written in high-level language to a machine language program, and functionally includes a syntax analysis unit 24, a general optimization unit 26, a movement judgment unit 28, a movement execution unit 30, an instruction scheduling unit 32, a register allocation unit 34, and an output unit 36.

The syntax analysis unit 24 is a processing unit that analyzes the syntax of a program 22 written in the C language (hereafter, "C program") using a general method, and translates the C program 22 into an intermediate program written in intermediate code which is easily handled within the compiler 20.

The general optimization unit 26 is a processing unit which performs a conventional general optimization on the intermediate program outputted by the syntax analysis unit 24. Induction variable optimization, common subexpression elimination, elimination of unnecessary code, and copy propagation can be given as examples of general optimization. These optimizations are not the main point of the present invention and thus detailed descriptions shall be omitted.

The movement judgment unit 28 is a processing unit which judges whether or not an instruction located outside of a loop can be moved into the loop. Detailed descriptions of processes performed by the movement judgment unit 28 shall be given later.

The movement execution unit 30 is a processing unit which moves the instruction judged to be movable by the movement judgment unit 28 into the loop. Detailed descriptions of processes performed by the movement execution unit 30 shall be given later.

The instruction scheduling unit 32 is a processing unit which performs normal instruction scheduling for parallelization, such as list scheduling.

The register allocation unit 34 is a processing unit which allocates virtual registers to actual registers; differing registers are allocated for virtual registers in the intermediate program whose live ranges overlap with one another.

The output unit 36 is a processing unit which converts the intermediate program to which actual registers have been allocated to a machine language program 38 and outputs the resultant.

Figure 3:
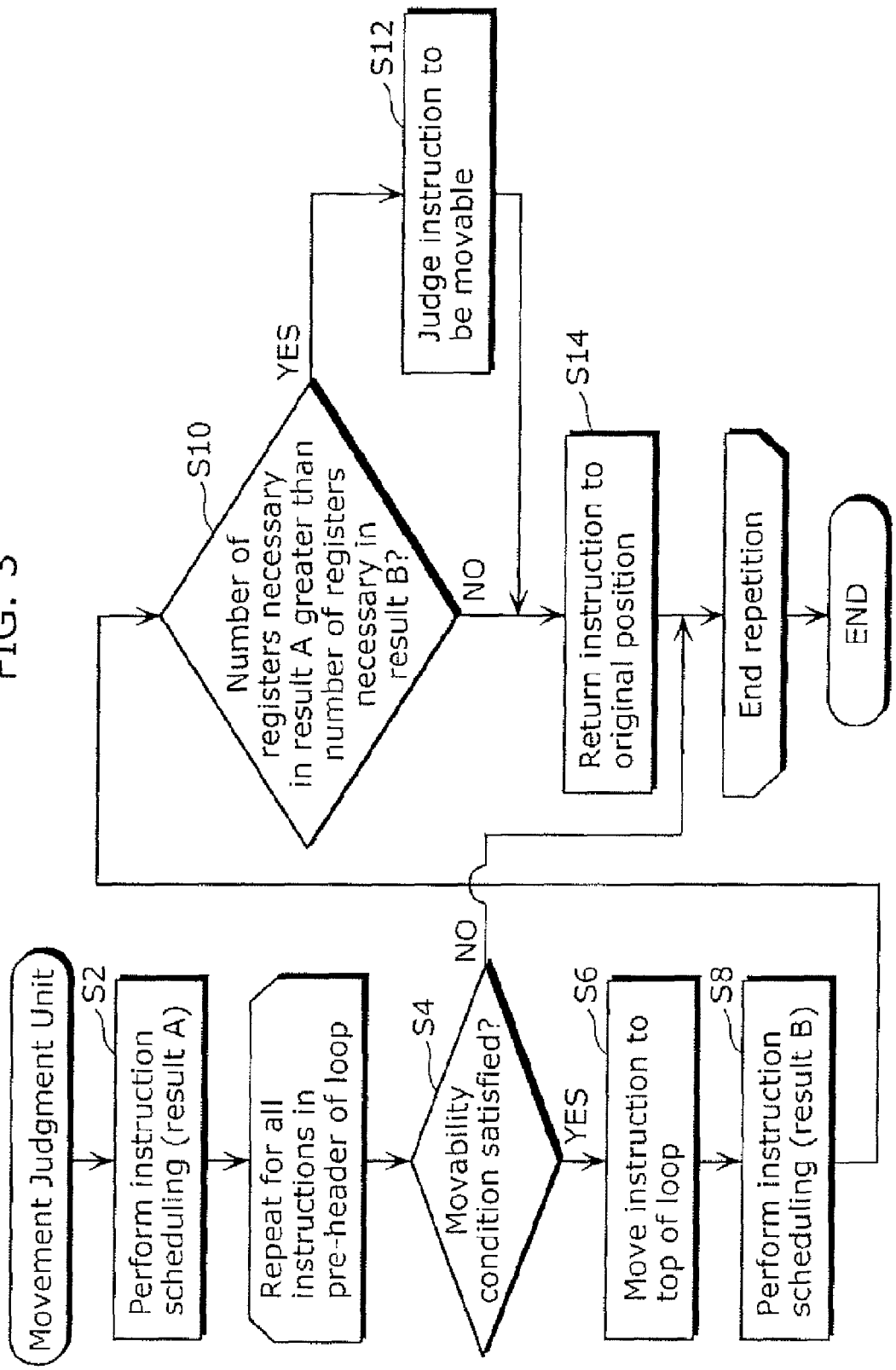
FIG. 3 is a flowchart showing a process executed by a motion judgment unit.

Next, a detailed description of the process performed by the movement judgment unit 28 shall be given. FIG. 3 is a flowchart showing the process performed by the movement judgment unit 28.

It should be noted that, as mentioned above, actual registers have not been allocated at this point in time; virtual registers, which assume unlimited register resources, are allocated to the operand of each instruction.

First, the movement judgment unit 28 performs instruction scheduling on the intermediate program in its original state, without moving any instructions; the result of this instruction scheduling is a result A (S2).

Next, the movement judgment unit 28 repeats movement judgment processing on all instructions in the pre-header of the loop. Here, the "pre-header of the loop" refers to a unique basic block outside of the loop that is executed immediately before the loop is started. The presence of plural basic blocks outside of the loop means that there is no pre-header of the loop, and thus repetitions of the movement judgment processing are not performed.

In the movement judgment processing, the movement judgment unit 28 first checks whether or not moving the target instruction into the loop will cause conflict in the logic of the program. This is equivalent to checking the following movability condition (MC):

the virtual register defined by the instruction is referred to only within the loop the definition is a unique definition the instruction is an unconditional executive instruction When the movability condition (MC) is not satisfied (NO of S4), the movement judgment unit 28 ends the movement judgment processing for that instruction.

When the movability condition (MC) is satisfied (YES of S4), the movement judgment processing continues. In other words, the movement judgment unit 28 causes the target instruction to be moved to the top of the loop (S6). Then, the movement judgment unit 28 performs instruction scheduling on the intermediate program after moving the instruction; the result of this instruction scheduling is a result B (S8).

The movement judgment unit 28 analyzes the live ranges of the virtual registers based on the result A and the result B and calculates the number of registers necessary in the loop. As a result, in the case where the number of necessary registers is less for the result B (YES of S10), the movement judgment unit 28 judges that the instruction is movable (S12). In the case where a value defined outside of the loop is only referred to inside the loop, the reference is performed until the final iteration of the loop, and thus the live range will cover the entire loop.

After the instruction has been judged as movable (S12), or in the case where the number of necessary registers in the result B is greater than or equal to the number of necessary registers in the result A (NO of S10), the movement judgment unit 28 returns the instruction moved in the instruction movement process (S6) back to its original position (S14). The movement judgment unit 28 repeats the abovementioned movement judgment processing on all instructions in the pre-header of the loop.

Figure 4:
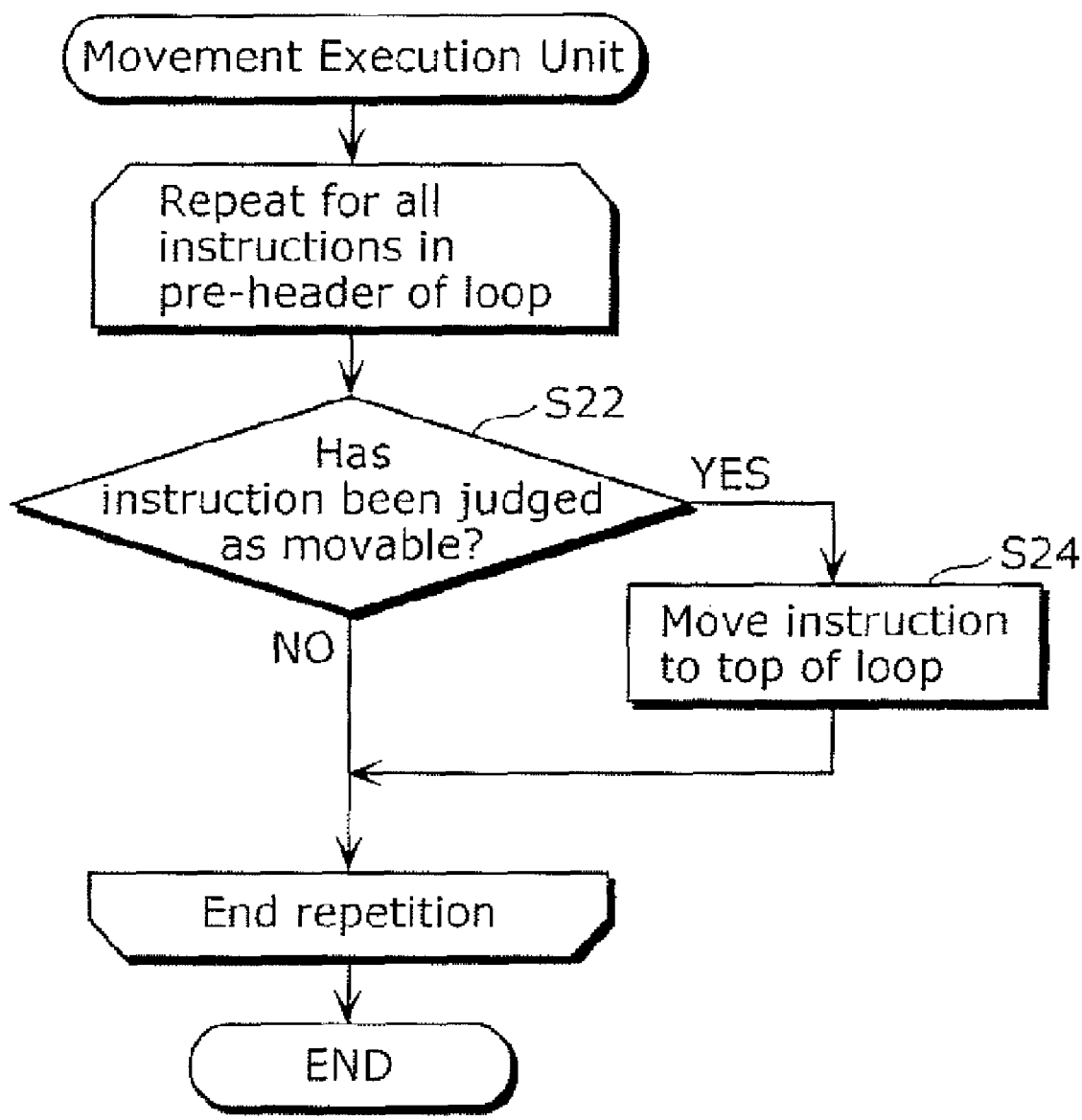
FIG. 4 is a flowchart showing a process executed by a motion execution unit.

Next, a detailed description of the process performed by the movement execution unit 30 shall be given. FIG. 4 is a flowchart showing the process performed by the movement execution unit 30.

The movement execution unit 30 repeats the following processing on each instruction in the pre-header of the loop. That is, when the target instruction is judged by the movement judgment unit 28 to be movable (YES of S22), the movement execution unit 30 moves the target instruction to the top of the loop (S24). When the target instruction is not judged to be movable (NO of S22), the movement execution unit 30 does not perform any processing.

Next, the processing performed by the compiler 20 shall be described in detail using the C program 22 as a specific example. In the present embodiment, the processes performed by the movement judgment unit 28 and the movement execution unit 30 are characteristic parts, and thus descriptions shall be given central to those characteristic parts.

Figure 1:
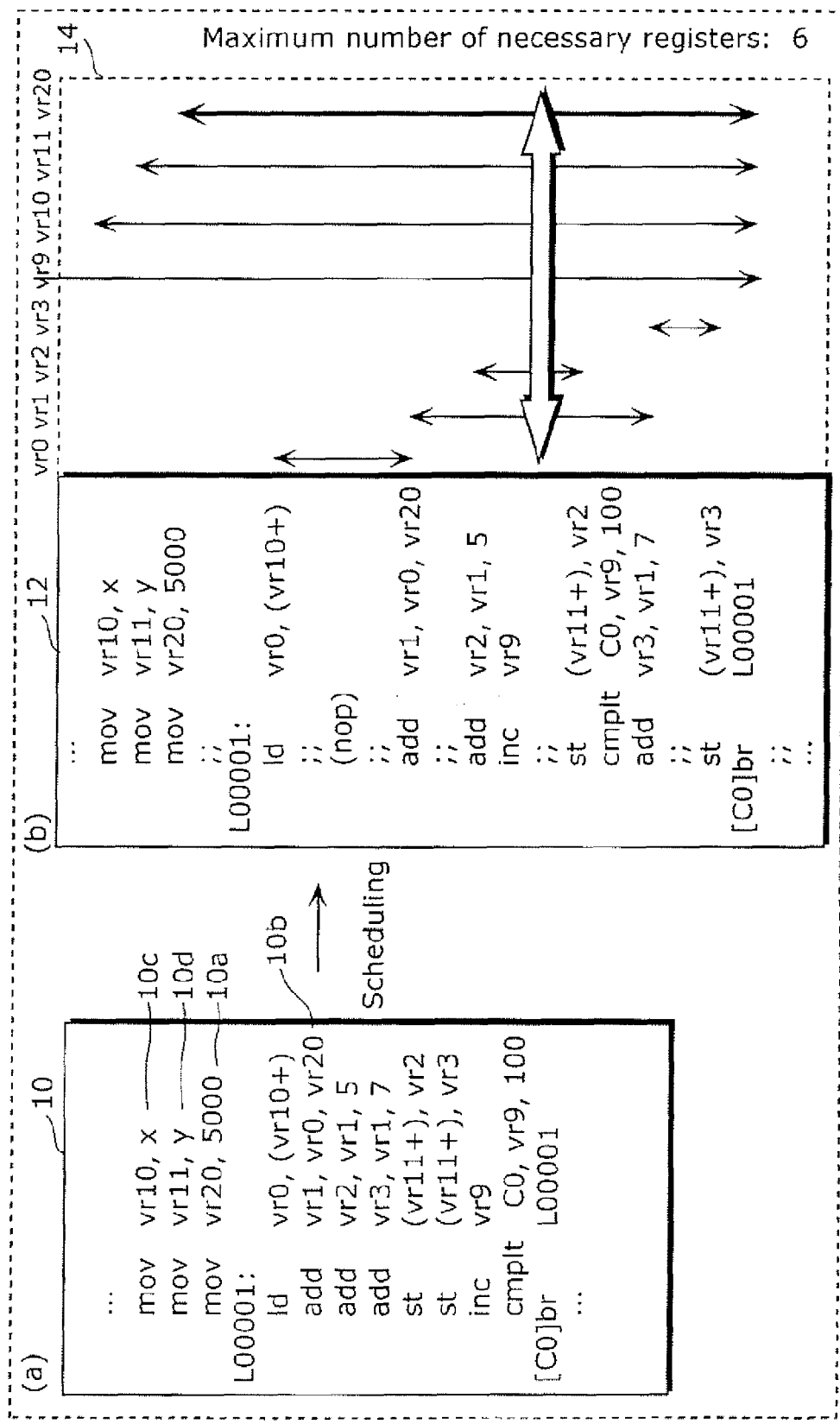
FIG. 1 is a diagram showing an example of an intermediate program and a live range of virtual registers.
Figure 5:
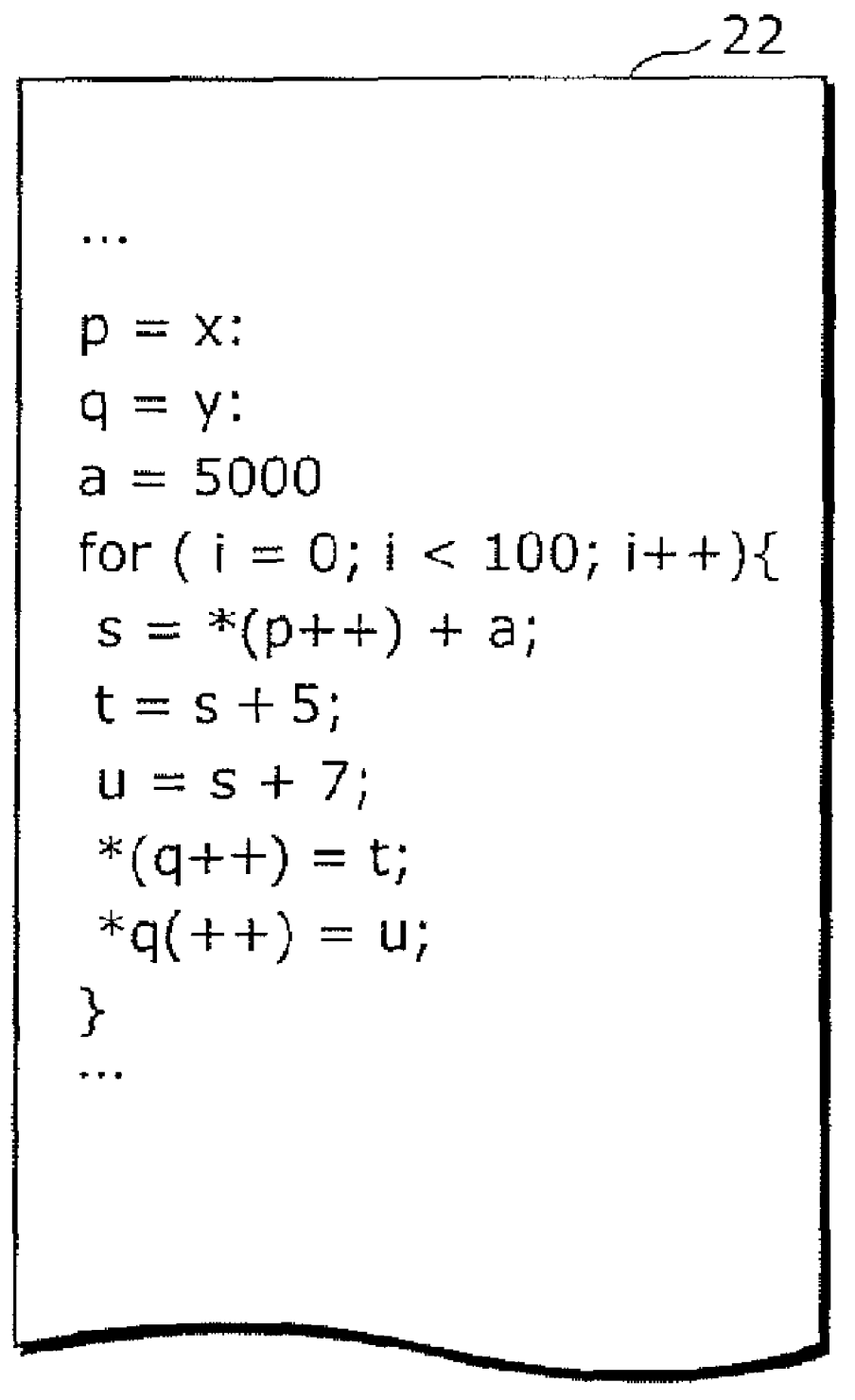

FIG. 5 is a diagram showing an example of a C program 22 which is inputted into the compiler 20. The syntax analysis unit 24 analyzes the syntax of the C program 22 and outputs an intermediate program. In addition, the general optimization unit 26 performs a general optimization on the intermediate program outputted by the syntax analysis unit 24, and outputs the optimized intermediate program. FIG. 1 (a) shows the optimized intermediate program 10.

The movement judgment unit 28 performs instruction scheduling on the intermediate program 10 (S2 of FIG. 3). The intermediate program 12 in FIG. 1 (b) is the result A of the instruction scheduling. Next, the movement judgment unit 28 judges whether or not movement is possible for each instruction in the pre-header of the loop of the intermediate program 10 (S4 to S14 of FIG. 3). That is, both the virtual register vr10 and the virtual register vr11, which are respectively defined in instructions 10c and 10d of the intermediate program 10, are also defined within the loop. Therefore, these registers do not satisfy the movability condition (MC).

Figure 6:
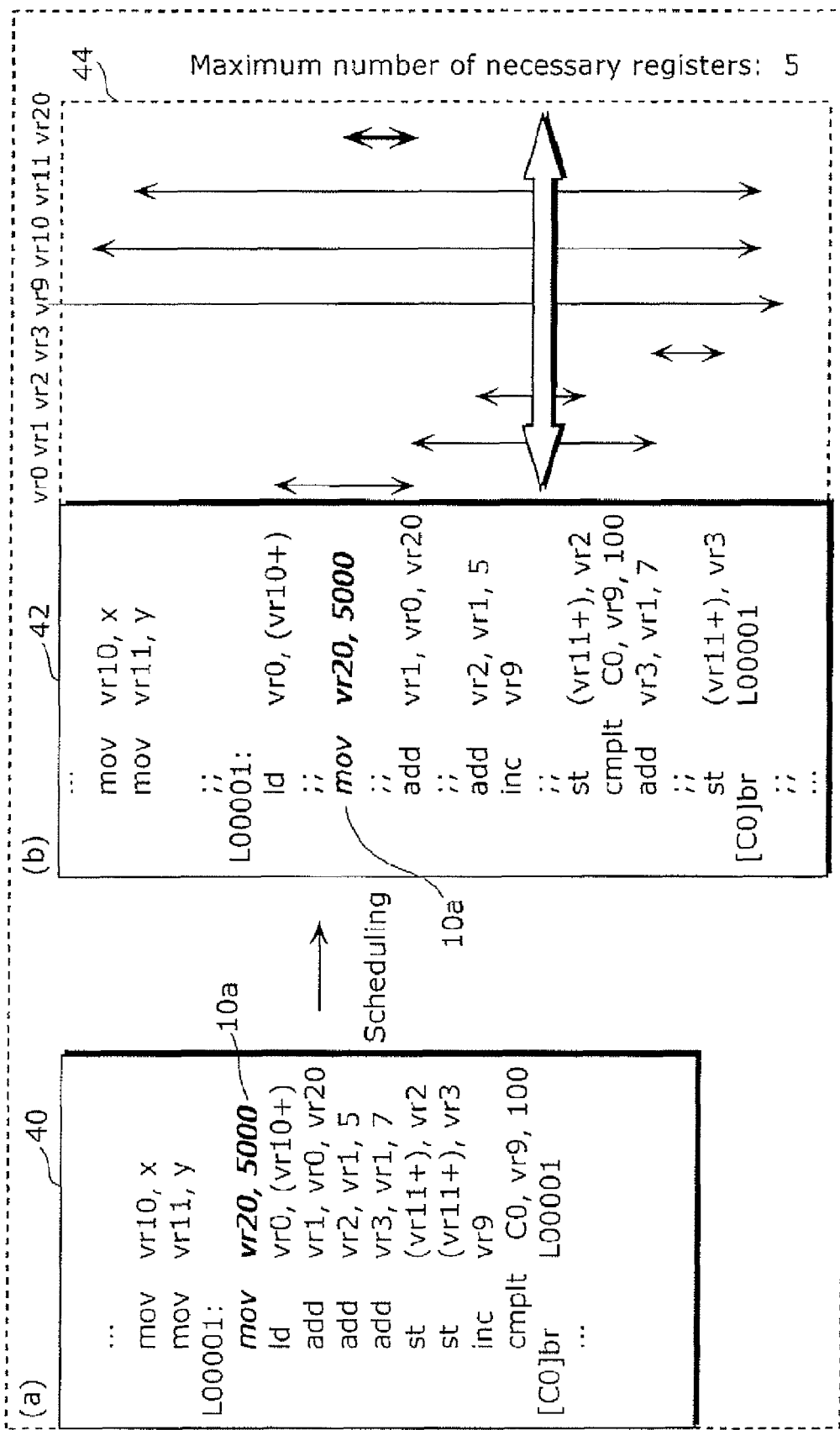
FIG. 6 is a diagram showing an example of an intermediate program after an instruction outside of the loop has been moved to within the loop, and live ranges of virtual registers.

On the other hand, the instruction 10a satisfies the movability condition (MC) and thus the movement judgment unit 28 causes the instruction 10a to be moved into the loop (S6 of FIG. 3). FIG. 6 (a) is a diagram showing an intermediate program 40, which is the intermediate program after the instruction 10a has been moved. In addition, the intermediate program 42 shown in FIG. 6 (b) shows the result B, which is the result of the movement judgment unit 28 performing instruction scheduling on the intermediate program 40 (S8 of FIG. 3).

Next, the movement judgment unit 28 calculates the maximum number of registers necessary in the result A (the intermediate program 12) and the result B (the intermediate program 42) (S10 of FIG. 3). FIGS. 1 (b) and 6 (b) show live range charts 14 and 44, which are the results of analysis on the live ranges of the intermediate programs 12 and 42 respectively. According to the live range chart 14, the maximum number of registers necessary based on the result A is six. As opposed to this, according to the live range chart 44, the maximum number of registers necessary based on the result B is five. Therefore, the maximum number of registers necessary has decreased by one in the result B. Accordingly, the movement judgment unit 28 judges the instruction 10a to be movable (YES of S10, and S12, in FIG. 3).

As only the instruction 10a in the pre-header of the loop is judged to be movable, the movement execution unit 30 moves only that instruction to the top of the loop (YES of S22, and S24, in FIG. 4). After this, the instruction scheduling unit 32 performs instruction scheduling, and the register allocation unit 34 allocates actual registers. Lastly, the output unit 36 translates the intermediate program to which the actual registers have been allocated into a machine language program 38 and outputs the resultant.

As a result, the machine language program 38 shown in FIG. 7 is generated. Note that FIG. 7 shows, for ease of understanding, an assembly program corresponding to the machine language program 38. As can be seen from the intermediate program 42 and the live range chart 44 in FIG. 6 (b), the live ranges of the virtual registers vr20 and vr1 do not overlap. Therefore, an actual register r3, which is common to the virtual registers vr20 and vr1, is allocated in the machine language program 38; thus it can be seen that only five registers, or registers r0 to r4, are used by the machine language program 38. In other words, it can be seen that moving the instruction 10a into the loop has decreased the number of necessary registers by one.

As described above, with the compiler according to the present embodiment, it is possible to decrease the number of registers necessary in the loop. Therefore, it is possible to increase the number of registers usable when the loop is executed. Accordingly, the probability that register spilling will occur can be reduced. In addition, the live ranges of registers can be shortened by moving instructions into the loop. Therefore, the probability of using a backup register drops, thus reducing the probability of executing code for saving/returning values held in the backup register to/from a stack. Accordingly, the possibility of decreasing the performance of the loop through causing unnecessary register spilling or the execution of save/return code is eliminated. This can improve the performance of the loop.

Second Embodiment

Next, a compiler according to the second embodiment of the present invention shall be described.

The compiler according to the second embodiment differs from the compiler of the first embodiment in that the method of judging whether or not the instruction is movable into the loop is different. In other words, in the first embodiment, judgment of whether or not the instruction is movable is performed based on the number of necessary registers; as opposed to this, in the second embodiment, judgment of whether or not the instruction is movable is performed based on the number of occurrences of register spilling.

The functional configuration of the compiler is the same as that shown in FIG. 2. In addition, the processes performed by processing units aside from the movement judgment unit 28 are the same as in the first embodiment; thus, detailed descriptions thereof shall not be repeated here.

Figure 8:
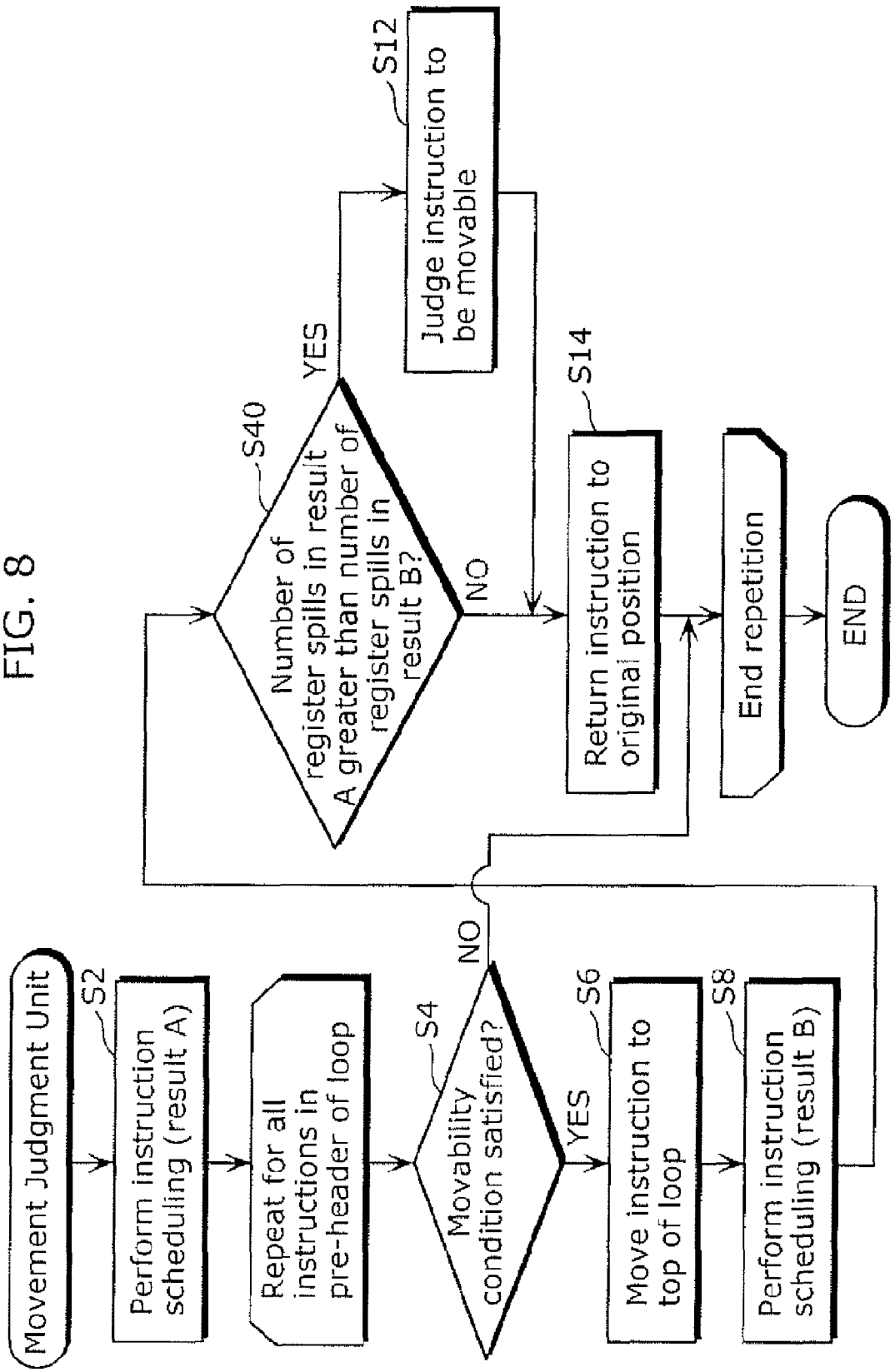
FIG. 8 is a flowchart showing a process executed by a motion judgment unit according to the second embodiment of the present invention.

FIG. 8 is a flowchart showing the process performed by the movement judgment unit 28. The processing performed by the movement judgment unit 28 according to the second embodiment replaces the processing in 510, as described in the processing performed by the movement judgment unit 28 in the first embodiment with reference to FIG. 3, with the processing in S40. In other words, the movement judgment unit 28 compares the number of occurrences of register spilling in the result A with the number of occurrences of register spilling in the result B. In the case where the number of occurrences of register spilling in the result B is lower than that of the result A (YES of S40), the movement judgment unit 28 judges that the number of occurrences of register spilling can be reduced by moving the instruction into the loop, and judges that the instruction can be moved into the loop (S12).

Other processes performed by the movement judgment unit 28 are identical to those described in the first embodiment, and thus detailed descriptions shall not be repeated here.

For example, a case in which the C program 22 shown in FIG. 5 is inputted into the compiler 20 can be considered. The number of registers that can be used in the loop is assumed to be four.

Figure 9:
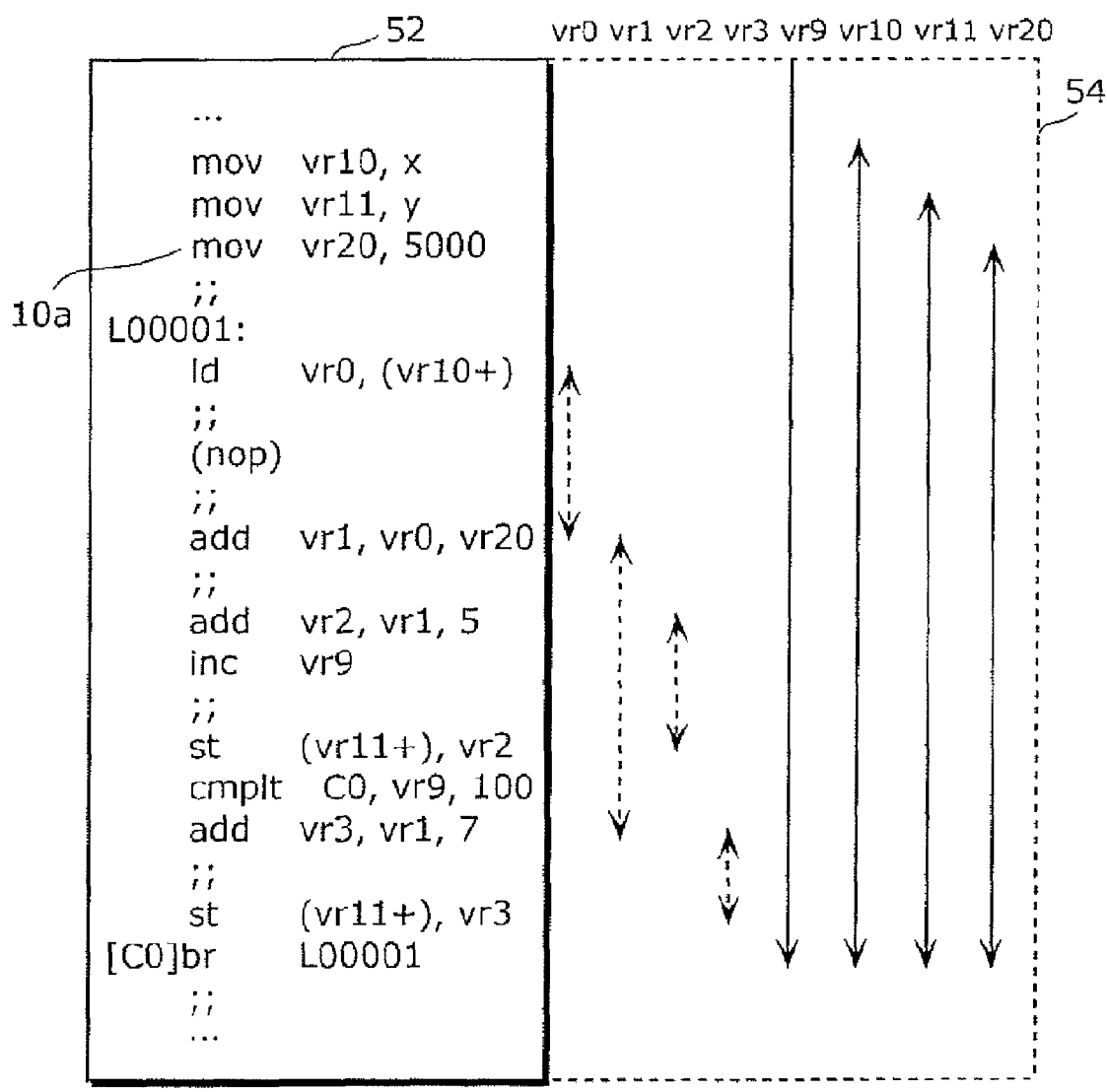
FIG. 9 is a diagram showing an example of an intermediate program before an instruction is inserted into the loop, and live ranges of registers used by the intermediate program.
Figure 10:
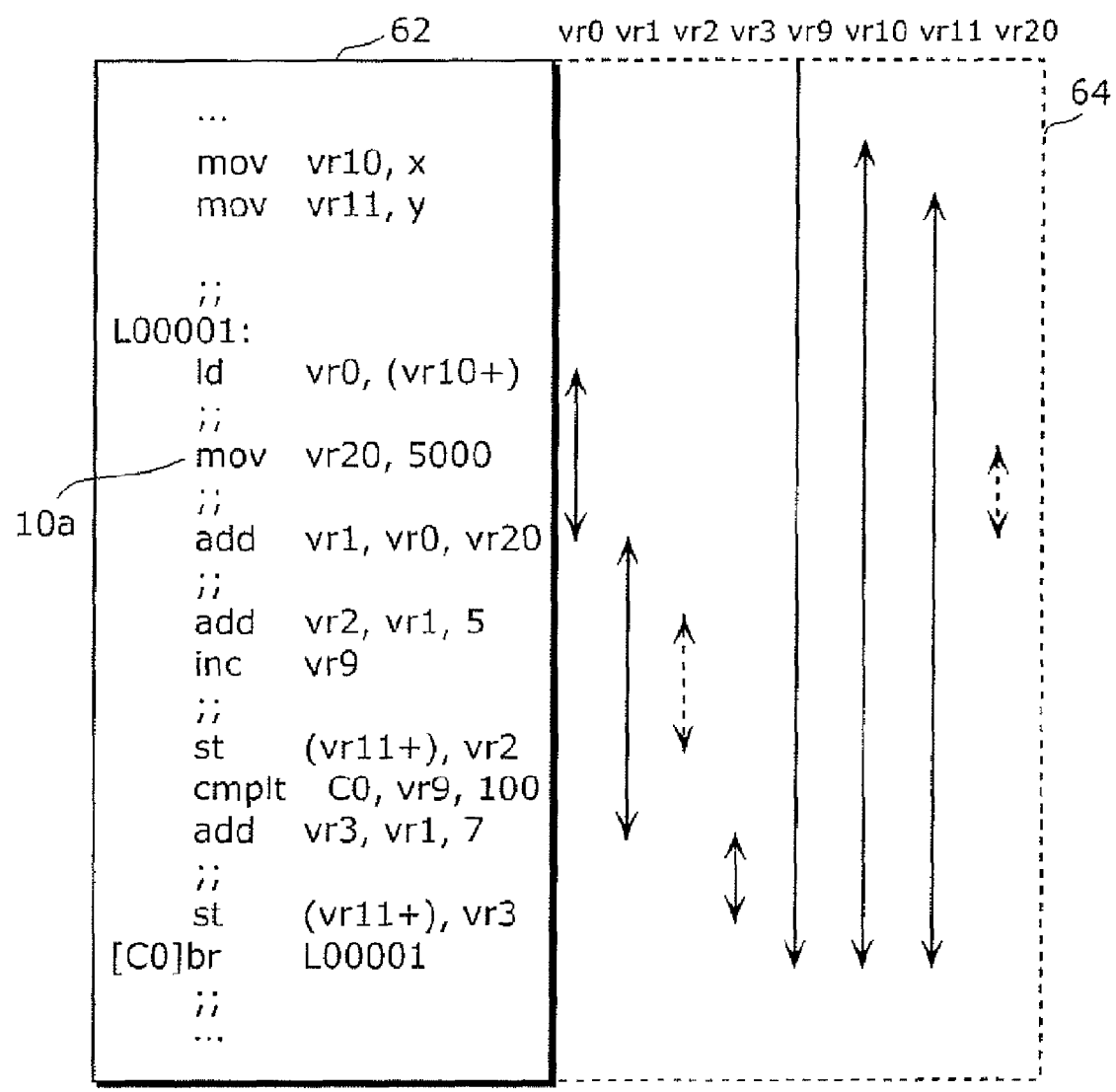
FIG. 10 is a diagram showing an example of an intermediate program after an instruction is inserted into the loop, and live ranges of registers used by the intermediate program.

FIG. 9 is a diagram showing an intermediate program 52, which is the intermediate program before the instruction 10a is inserted into the loop (the result A), and a live range chart 54 of the registers used in the intermediate program 52. FIG. 10 is a diagram showing an intermediate program 62, which is the intermediate program after the instruction 10a is inserted into the loop (the result B), and a live range chart 64 of the registers used in the intermediate program 62.

In the live range chart 54 in FIG. 9, live ranges in which register spilling occurs are indicated by dotted lines. From the live range chart 54, it can be seen that, with the result A, a total of four incidences of register spilling occur in one iteration of the loop.

On the other hand, in the live range chart 64 in FIG. 10, with the result B, a total of two incidences of register spilling occur in one iteration of the loop. Accordingly, because the number of occurrences of register spilling is reduced in the result B (S40 of FIG. 8), the movement judgment unit 28 judges the instruction 10a to be movable (S12 of FIG. 8).

As described above, with the compiler 20 according to the present embodiment, it is possible to reduce the number of occurrences of register spilling. Accordingly, the possibility of decreasing the performance of the loop due to causing unnecessary register spilling is eliminated. Hence, the performance of the loop can be improved.

Third Embodiment

Next, a compiler according to the third embodiment of the present invention shall be described.

The compiler according to the third embodiment judges whether or not an instruction is movable into the loop based on the maximum number of necessary registers when executing the loop, as in the first embodiment; however, the compiler in the third embodiment differs from that of the first embodiment in that the compiler judges whether or not an instruction that is data-dependent on an instruction moved into the loop can also be moved into the loop.

The functional configuration of the compiler is the same as that shown in FIG. 2. In addition, the processes performed by processing units aside from the movement judgment unit 28 are the same as in the first embodiment; thus, detailed descriptions thereof shall not be repeated here.

Figure 11:
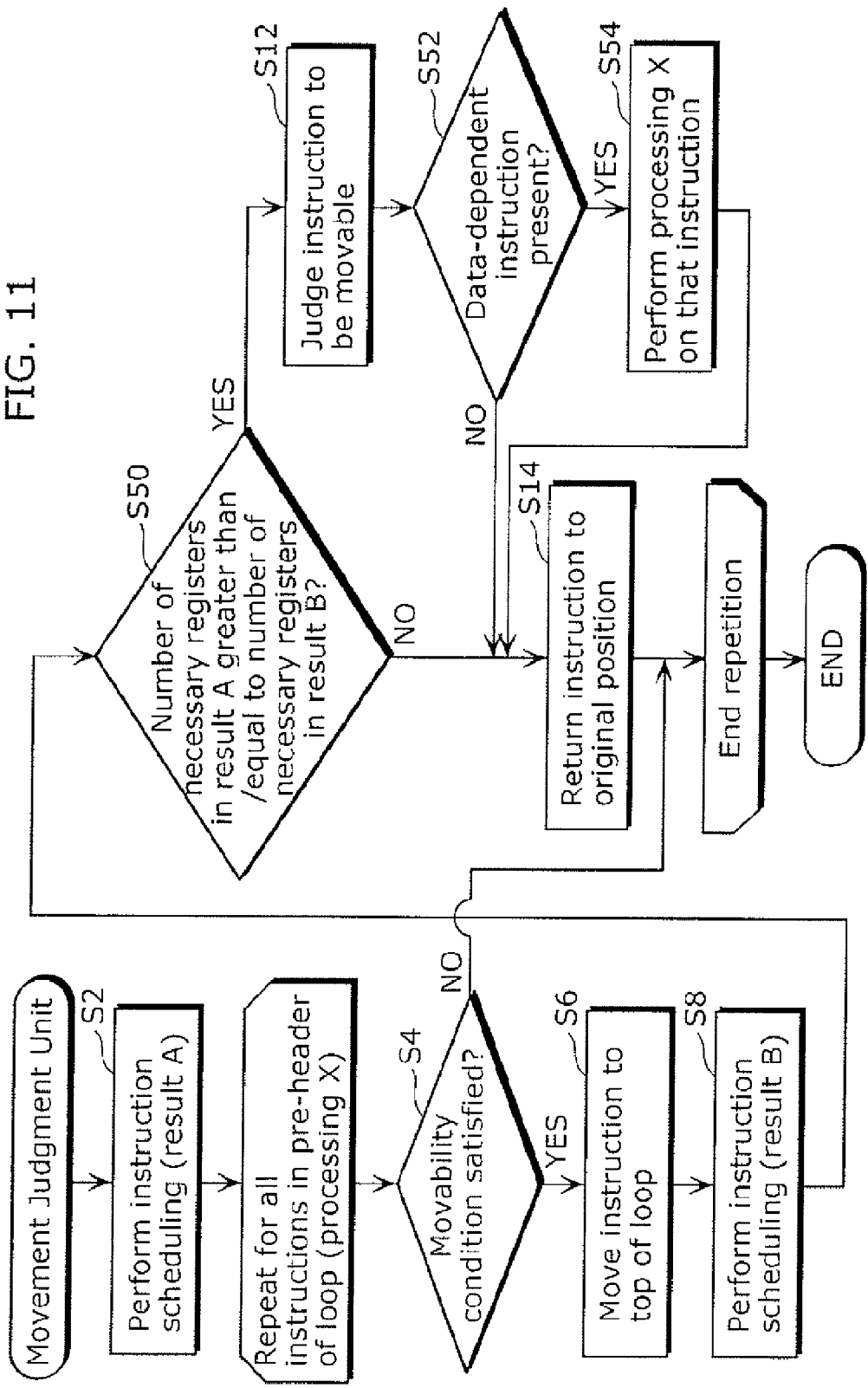
FIG. 11 is a flowchart showing a process executed by a motion judgment unit according to the third embodiment of the present invention.

FIG. 11 is a flowchart showing a process performed by the movement judgment unit 28. The processing performed by the movement judgment unit 28 according to the third embodiment adds processing in S52 and S54 to the processing performed by the movement judgment unit 28 of FIG. 3 in the first embodiment.

That is, the movement judgment unit 28 examines whether or not an instruction that is data-dependent on an instruction judged to be movable is present within an intermediate program. Based on this judgment, the movement judgment unit 28 recursively performs the processing from S4 ("processing X" in FIG. 11) on the instruction that is data-dependent.

In addition, as opposed to the first embodiment, the movement judgment unit 28 judges the instruction to be movable even in the case where the number of necessary registers in the result A is the same as the number of necessary registers in the result B (YES of S50, S12). This is due to the following reason: while there is no decrease in the number of necessary registers even if the currently targeted instruction is moved, there is the possibility that the number of necessary registers can be reduced by moving the instruction that is data-dependent on the targeted instruction.

Figure 12:
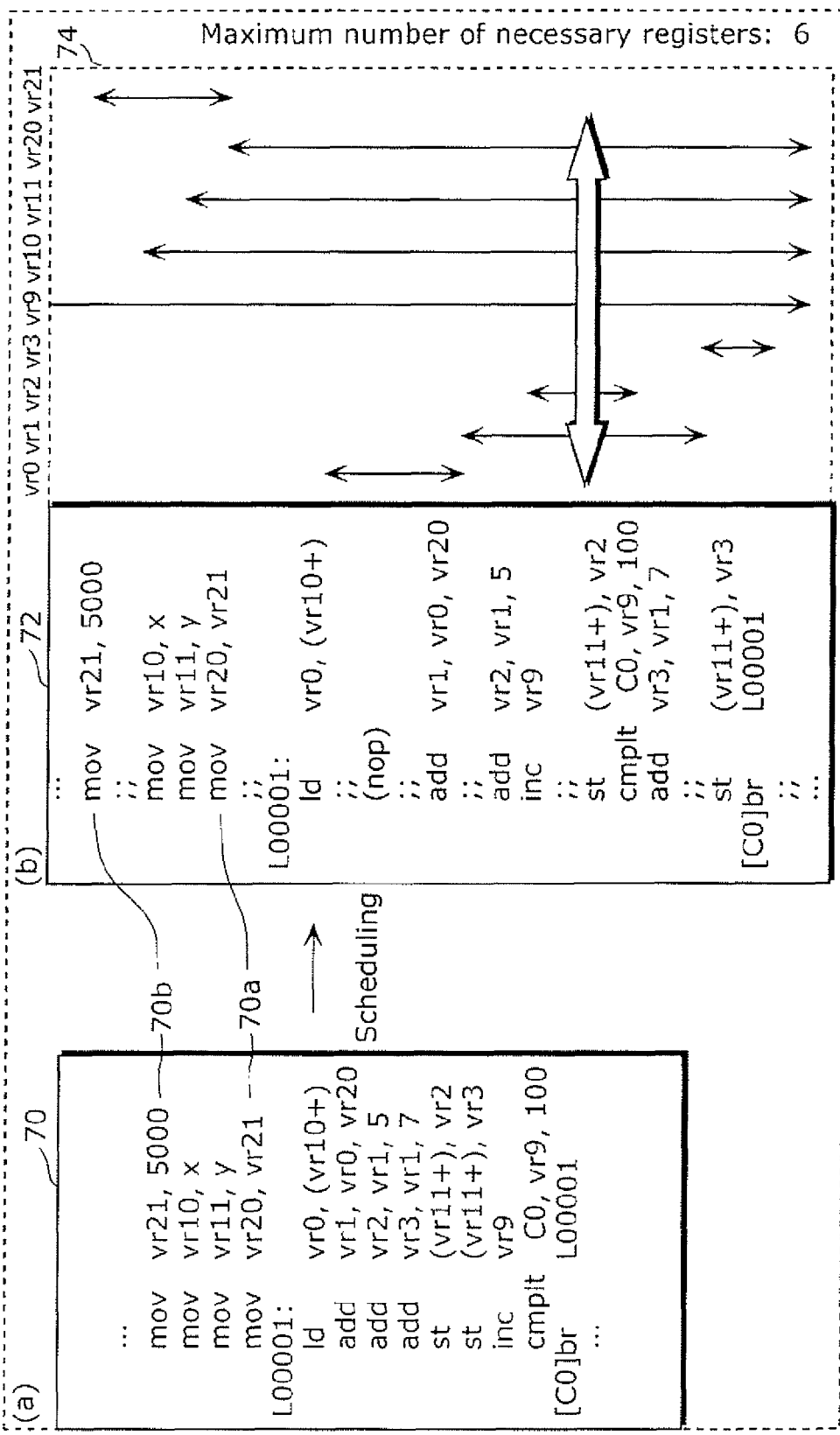
FIGS. 12 to 14 are diagrams illustrating instruction movement processing.
Figure 13:
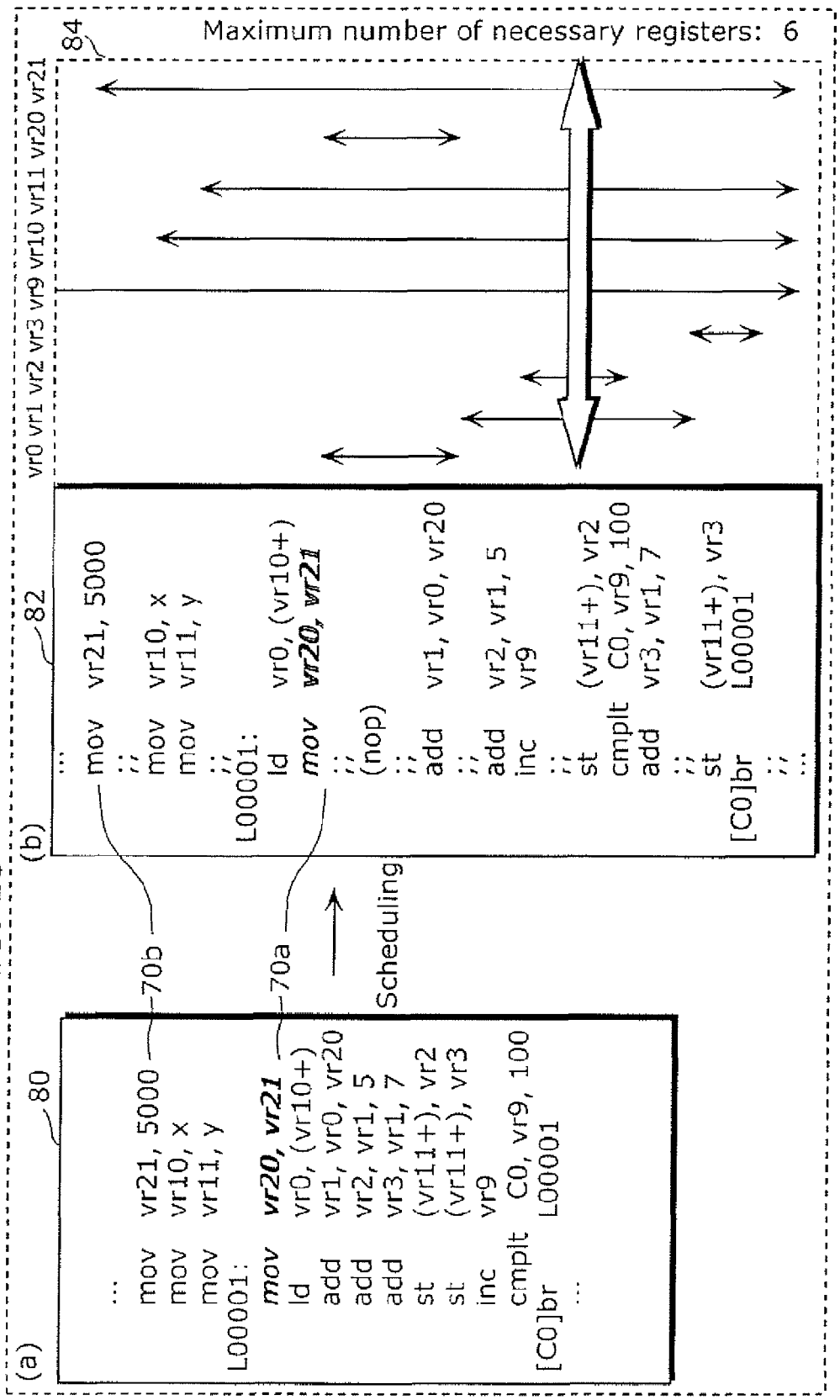
Figure 14:
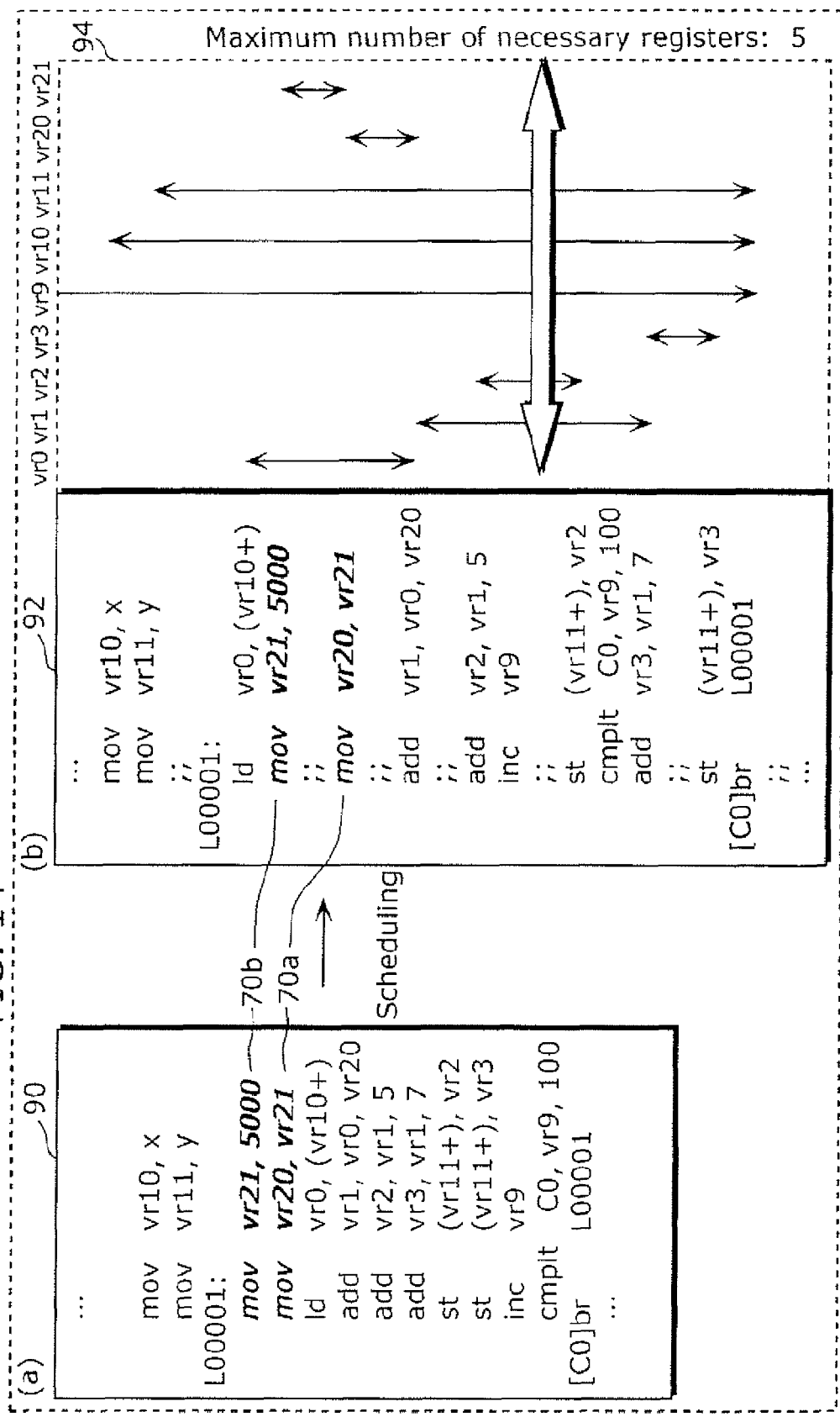

Next, a process for moving the instruction in the present embodiment shall be described using an actual program as an example. FIGS. 12 to 14 are diagrams illustrating instruction movement processing. FIG. 12(a) is a diagram showing an example of an intermediate program 70 outputted by the general optimization unit 26. In addition, FIG. 12(b) is a diagram showing an intermediate program 72, which is the result of the movement judgment unit 28 performing instruction scheduling (S2 of FIG. 11) on the intermediate program 70, and a live range chart 74. At this point in time, the maximum number of necessary registers is six.

Next, the movement judgment unit 28 causes an instruction 70a to be moved (S6 of FIG. 11). FIG. 13(a) is a diagram showing the post-movement intermediate program 80, and from this diagram, it can be seen that the instruction 70a has been moved into the loop. The movement judgment unit 28 performs instruction scheduling on the intermediate program 80 (S8 of FIG. 11). FIG. 13(b) is a diagram showing an intermediate program 82, which is the result B of the scheduling process, and a live range chart 84. As indicated by the live range chart 84, the number of registers necessary in the intermediate program 82 is six, which is the same as the number of registers necessary in the intermediate program 72 (YES of S50); however, the movement judgment unit 28 judges the instruction 70a to be movable.

Moreover, the movement judgment unit 28 performs the same movement judgment processing (processing X) on the instruction 70b, which is data-dependent on the instruction 70a. FIG. 14 is a diagram that illustrates this processing. As a result of this processing, the movement judgment unit 28 causes the instruction 70b, which satisfies the movability condition MC, to be moved to the top of the loop (YES of S4, S6). FIG. 14(a) is a diagram that shows an intermediate program 90 after the instruction 70b has been moved. The movement judgment unit 28 performs instruction scheduling on the intermediate program 90, and generates the intermediate program 92 (the result B) shown in FIG. 14(b) (S8). According to the live range chart 94 for the intermediate program 92 shown in FIG. 14(b), the number of registers necessary in the intermediate program 92 is five, which is one less than before the instruction 70b was moved (YES of S50). Thus, the movement judgment unit 28 judges that the instructions 70a and 70b are both movable (S12).

As described above, with the compiler 20 according to the present embodiment, judgment of whether or not the instruction can be moved into the loop is recursively performed on instructions that are data-dependent on instructions moved into the loop, in addition to the processes described in the first embodiment. Therefore, there is the possibility that the number of registers necessary in the loop can be reduced even further than was possible in the first embodiment. Thus, it is possible to improve the performance of the loop, in the same manner as with the first embodiment.

Fourth Embodiment

Next, a compiler according to the fourth embodiment of the present invention shall be described.

The compiler according to the fourth embodiment differs from the compilers of the above embodiments in that the method of judging whether or not the instruction is movable into the loop is different. That is, in the present embodiment, movement judgment is performed through parameters generated based on a target instruction itself.

The functional configuration of the compiler is the same as that shown in FIG. 2. In addition, the processes performed by processing units aside from the movement judgment unit 28 are the same as in the first embodiment; thus, detailed descriptions thereof shall not be repeated here.

Before describing the process performed by the movement judgment unit 28, the terms "live start number" and "live end number" of an instruction shall be defined and the definitions explained. Furthermore, a change in the maximum number of necessary registers resulting from the movement of the instruction shall also be described.

An instruction defines a certain variable and refers to another certain variable. If the instruction performs the first definition of a certain variable, the live range of that variable starts from that instruction; if the instruction performs the final reference to a certain variable, the live range of that variable ends with that instruction.

In other words, an instruction exists either to start a live range or to end a live range. Accordingly, the number of live ranges of variables started by that instruction is defined as a "live start number," and the number of live ranges of variables ended by that instruction is defined as a "live end number."

Figure 15:
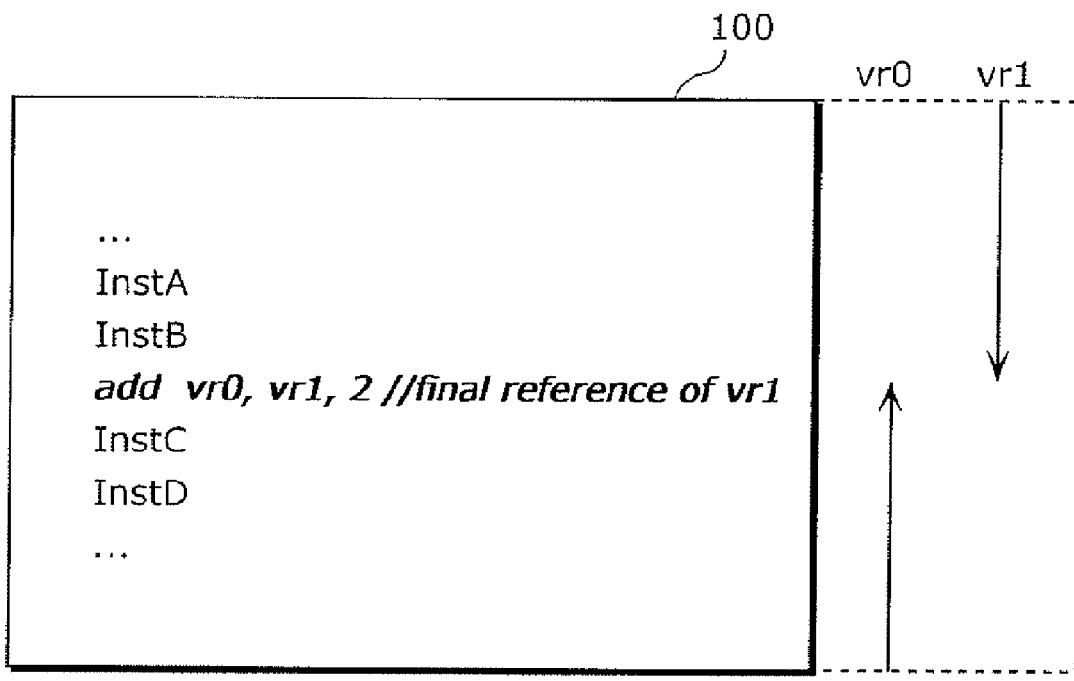
FIGS. 15 to 19 are diagrams illustrating live start numbers and live end numbers.

For example, in an intermediate program 100 such as shown in FIG. 15, an add instruction performs the first definition of a virtual register vr0 and the final definition of a virtual register vr1. In this case, the live start number and live end number for the add instruction are both 1. In such a case, where the live start number and the live end number are in a relationship where they are equal, the maximum number of registers necessary will not be affected by moving the instruction.

Figure 16:
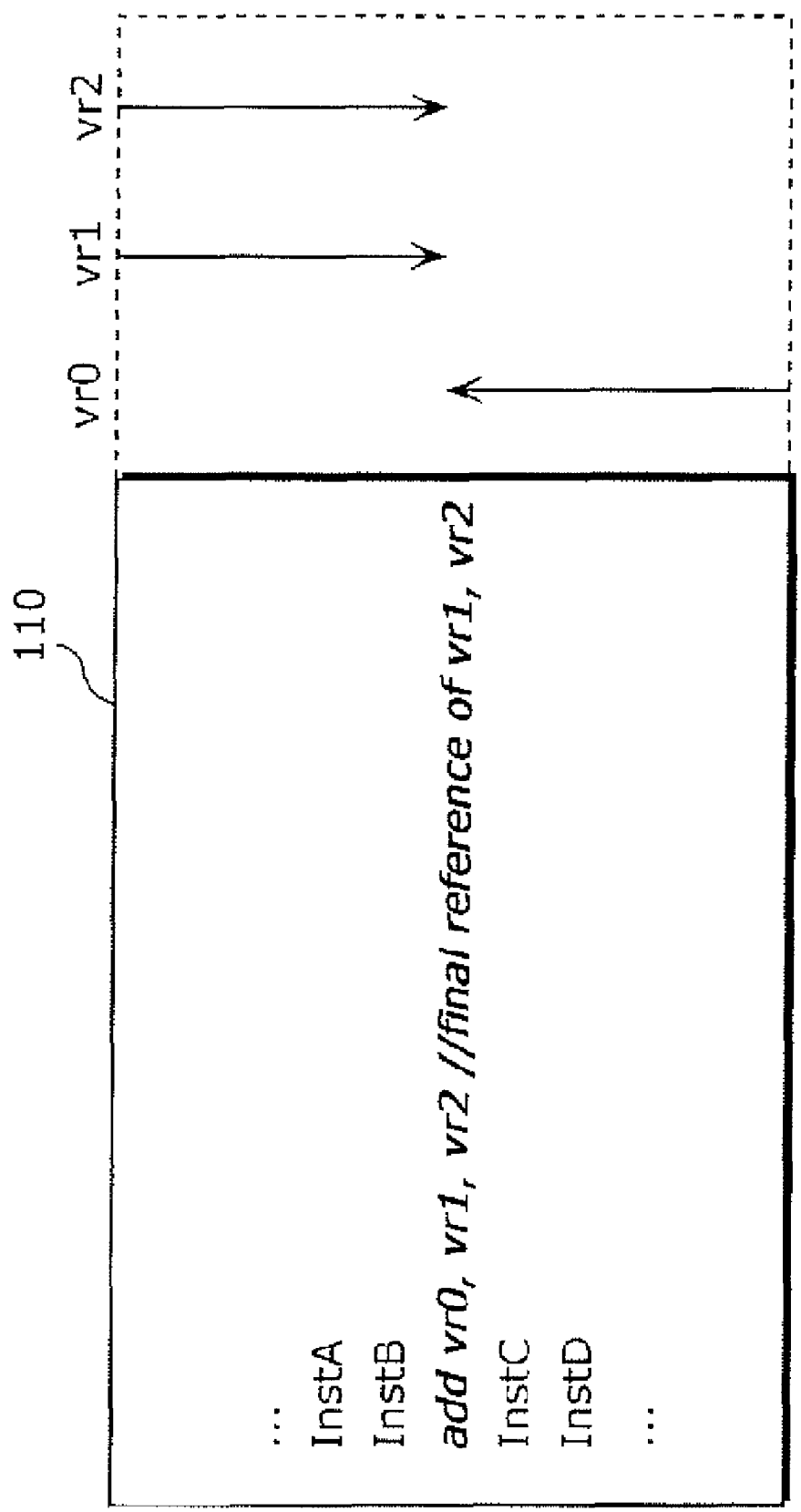

Next, in an intermediate program 110 such as shown in FIG. 16, an add instruction performs the first definition of a virtual register vr0 and the final definition of virtual registers vr1 and vr2. In this case, the live start number for the add instruction is 1, and the live end number for the add instruction is 2. In such a case, where the live start number and the live end number are in a relationship where the live start number is smaller, there is the possibility that the maximum number of necessary registers can be reduced by moving the instruction upwards in the program (that is, toward InstB and InstA in FIG. 16). However, strictly speaking, the live start numbers and live end numbers of InstA and InstB must also be considered.

Figure 17:
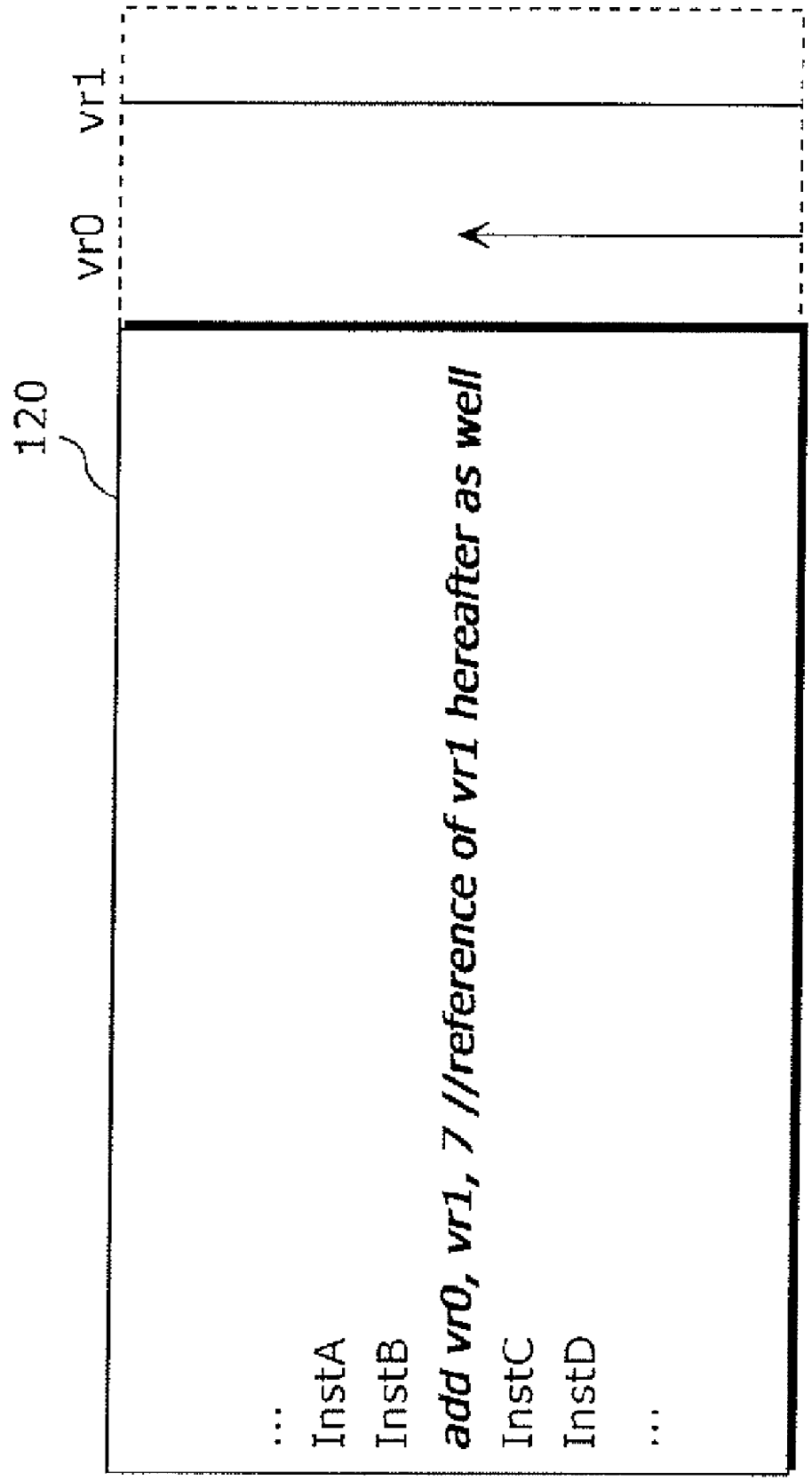

Next, in an intermediate program 120 such as that shown in FIG. 17, an add instruction performs only the first definition of a virtual register vr0, and performs neither the first definition of a virtual register vr1 nor the final reference to the virtual register vr1. In this case, the live start number for the add instruction is 1, and the live end number for the add instruction is 0. In such a case, when the live start number and the live end number are in a relationship where the live start number is greater, there is the possibility that the maximum number of necessary registers can be reduced by moving the instruction downwards in the program (that is, toward InstC and InstD in FIG. 17). However, strictly speaking, the live start numbers and live end numbers of InstC and InstD must also be considered.

As described above, in the case where the live start number and live end number for a certain instruction differ, there is the possibility that the maximum number of necessary registers can be reduced by moving the instruction. However, even when there is such a possibility, there are still situations where the maximum number of necessary registers can be reduced no further, depending on the position of the destination of the instruction.

Figure 18:
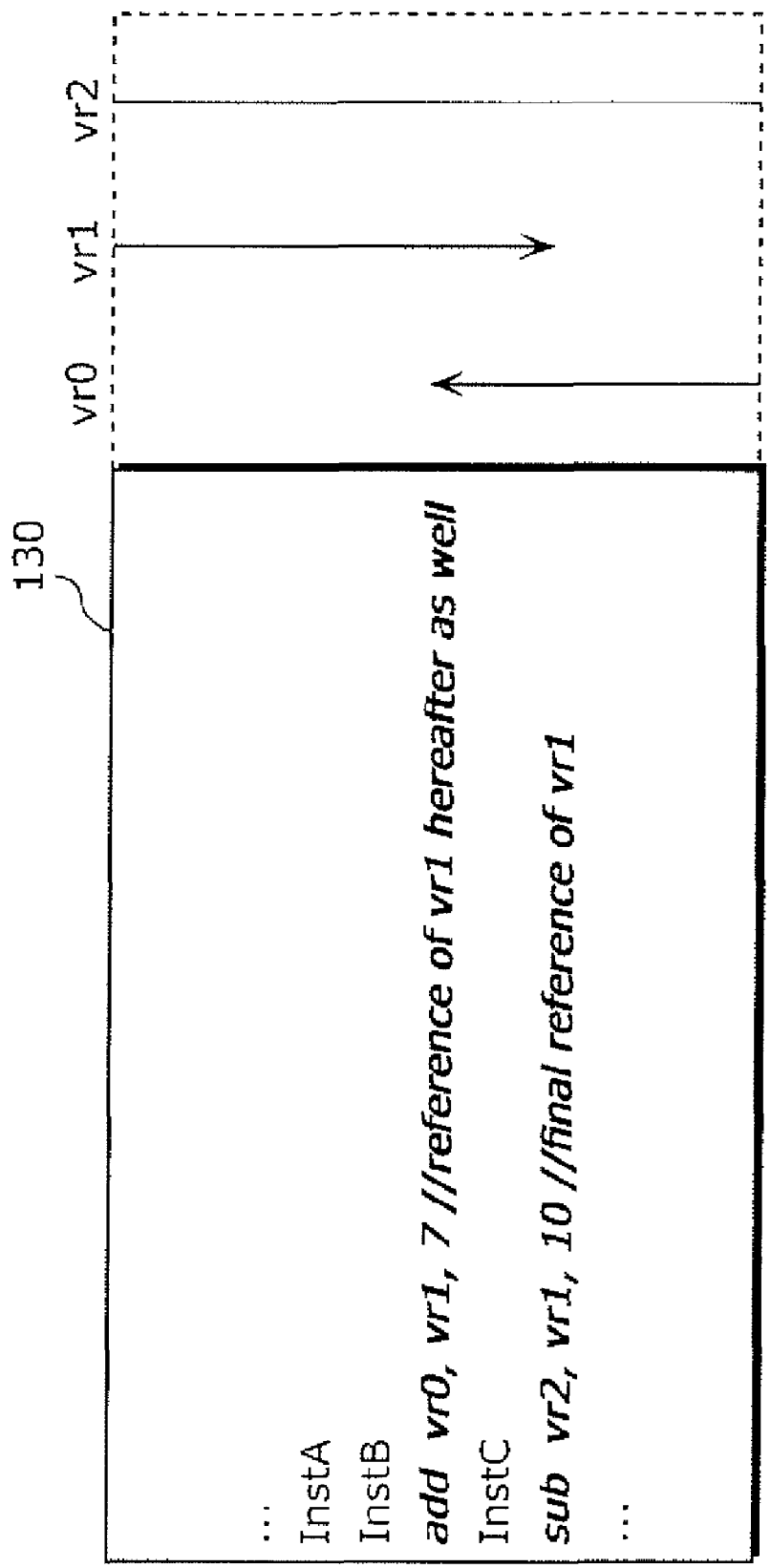

This phenomenon shall be described with reference to FIG. 18. In an intermediate program 130 shown in this diagram, a virtual register vr0 is first defined by the add instruction, and a virtual register vr1 is lastly referred to by a sub instruction. Thus, the live start number for the add instruction is 1, and the live end number for the add instruction is 0. Also, the live start number for the sub instruction is 0, and the live end number for the sub instruction is 1. Accordingly, the live start number and the live end number for the add instruction are in a relationship where the live start number is greater. Therefore, there is the possibility that the maximum number of necessary registers can be reduced by moving the add instruction downward.

Figure 19:
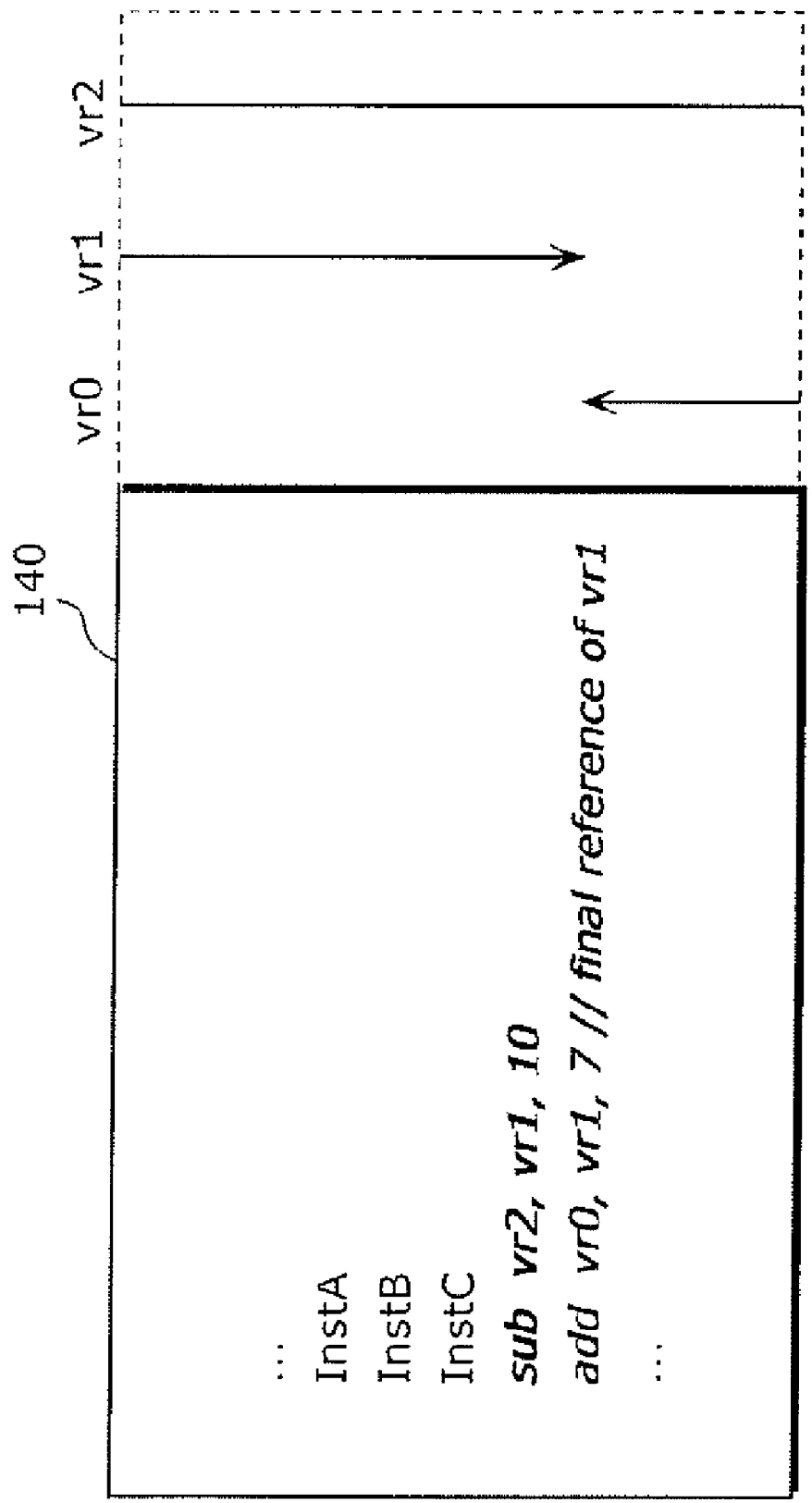

However, as indicated by an intermediate program 140 shown in FIG. 19, when the add instruction is positioned lower than the sub instruction, the point at which the live range of a virtual register vr1 ends, which was originally the sub instruction, becomes the point at which the add instruction is executed. Accordingly, the live start number and live end number for the add instruction become 1, and the live start number and the live end number for the add instruction are in a relationship where they are equal.

Therefore, it should be noted that moving the add instruction to below the sub instruction has no effect on the maximum number of necessary registers.

Figure 20:
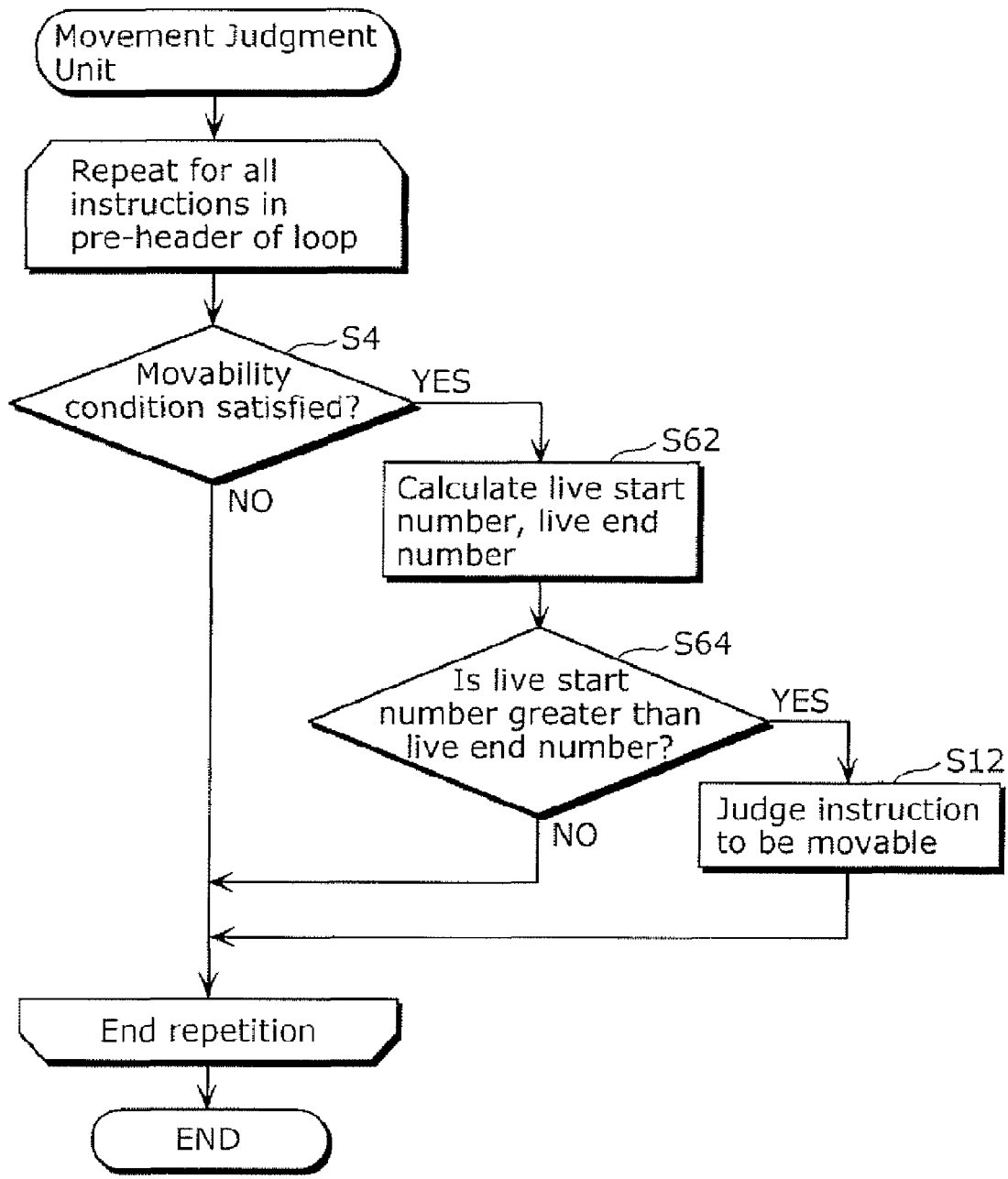
FIG. 20 is a flowchart showing a process executed by a motion judgment unit according to the fourth embodiment of the present invention.

FIG. 20 is a flowchart showing a process executed by the motion judgment unit 28 according to the present embodiment.

The movement judgment unit 28 judges whether or not all instructions in the per-header of the loop satisfy the above-mentioned movability condition (MC) (YES of S4), and calculates the live start number and live end number of an instruction that satisfies the movability condition (MC) (S62). The movement judgment unit 28 judges whether or not the live start number of the instruction is greater than the live end number of the so instruction (YES of S64), and when such is the case, there is the possibility that the maximum number of necessary registers can be reduced by moving the instruction downward; thus, the movement judgment unit 28 judges the instruction to be movable (S12).

By performing the above movement judgment processing on instructions and moving an instruction with a high live start number into the loop, there is the possibility that the number of virtual registers present in the loop can be decreased. For example, taking the intermediate program 10 shown in FIG. 1 (*a*) into consideration, the live range of the virtual register vr20 is started with the instruction 10*a*, but there is nothing to end the live range of the virtual register vr20. Therefore, the instruction 10*a* has a live start number of 1 and a live end number of 0; thus, the live start number is greater than the live end number (YES of S64), and the movement judgment unit 28 judges this instruction to be movable.

As described above, with the compiler 20 according to the present embodiment, the number of registers necessary in the loop can be reduced by moving an instruction in which the live start number is greater than the live end number into the loop. Therefore, it is possible to increase the number of registers usable when the loop is executed. Thus, the probability of the occurrence of register spilling can be reduced. In addition, the live range of registers can be shortened by moving instructions into the loop. Therefore, the probability of using a backup register drops, thus reducing the probability of executing code for saving/returning values held in the backup register to/from a stack. Therefore, the possibility of decreasing the performance of the loop by causing unnecessary register spilling or through the execution of save/return code is eliminated. Hence, the performance of the loop can be improved.

Note that in the present embodiment, the movement judgment unit 28 judges whether or not an instruction is movable into the loop based on the live start number and live end number of the instruction; however, in the case where it is difficult to make a complete analysis of the live start are and live end area of instructions, an approximate comparison of the live start number and the live end number may be made by comparing the number of registers defined in the instruction with the number of registers referred to in the instruction.

Fifth Embodiment

Next, a compiler according to the fifth embodiment of the present invention shall be described.

In the compilers according to the above first through fourth embodiments, instruction scheduling and register allocation is performed after movement judgment processing and movement execution processing is performed on an instruction;

however, the compiler according to the present invention differs from the compilers of the first through fourth embodiments in that movement judgment processing and movement execution processing are performed after instruction scheduling and before register allocation.

Figure 21:
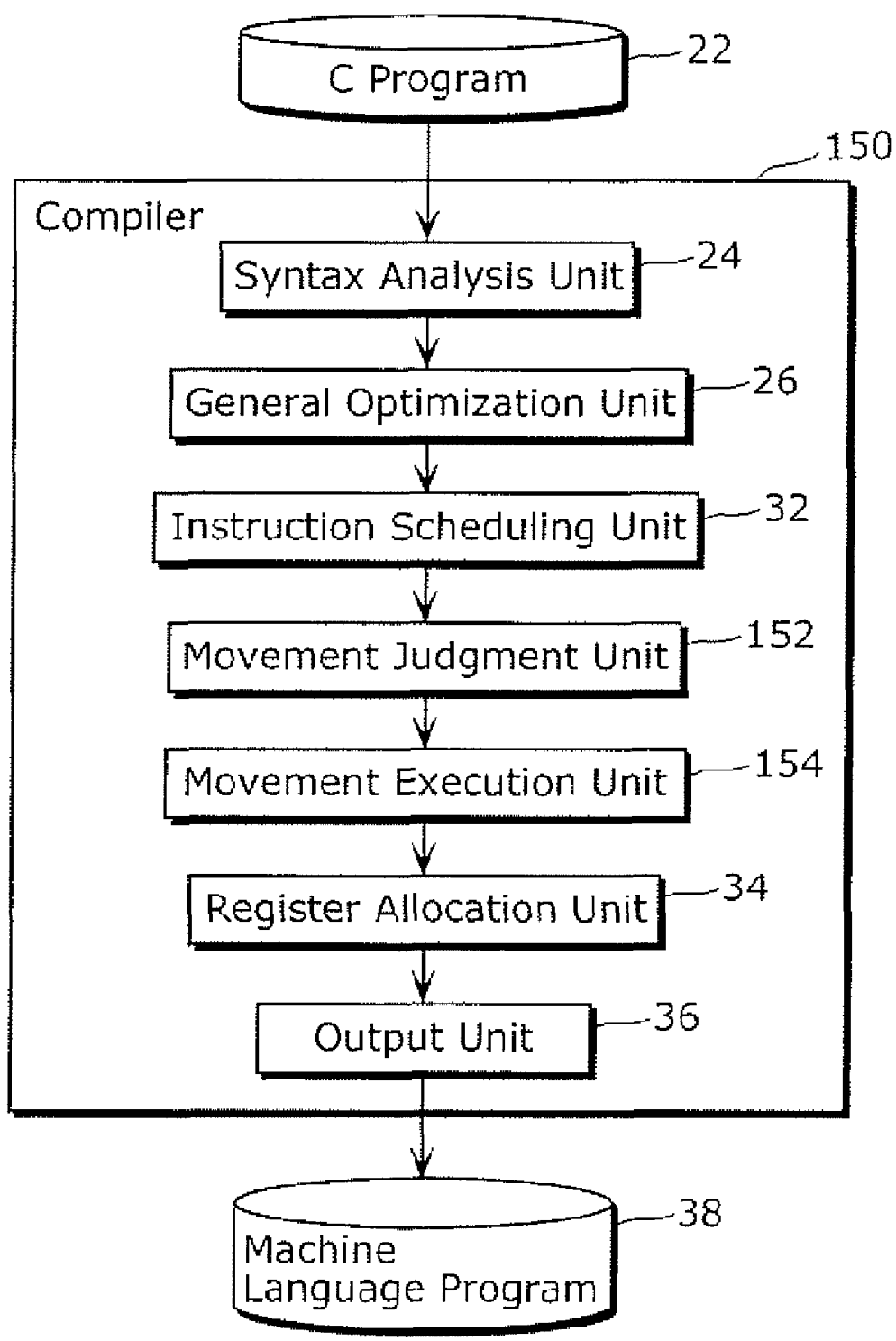
FIG. 21 is a block diagram that functionally shows a configuration of a compiler according to the fifth embodiment of the present invention.

FIG. 21 is a block diagram that functionally shows a configuration of a compiler according to the present embodiment. The compiler 150 is computer software, the target processor of which can execute three instructions in parallel, that translates a source program written in high-level language to a machine language program, and functionally includes a syntax analysis unit 24, a general optimization unit 26, an instruction scheduling unit 32, a movement judgment unit 152, a movement execution unit 154, a register allocation unit 34, and an output unit 36.

Processing units aside from the movement judgment unit 152 and the movement execution unit 154 are the same as those described in the first embodiment, and thus detailed descriptions thereof shall not be repeated here.

The movement judgment unit 152 is a processing unit which is inputted with an intermediate program on which instruction scheduling has been performed by the instruction scheduling unit 32 and judges whether or not an instruction positioned outside of the loop is movable into the loop. Detailed descriptions of processes performed by the movement judgment unit 152 shall be given later.

The movement execution unit 154 is a processing unit which moves an instruction judged as movable by the movement judgment unit 152, from among the instructions included in the intermediate program on which instruction scheduling has been performed by the instruction scheduling unit 32, into the loop. Detailed descriptions of processes performed by the movement execution unit 154 shall be given later.

Figure 22:
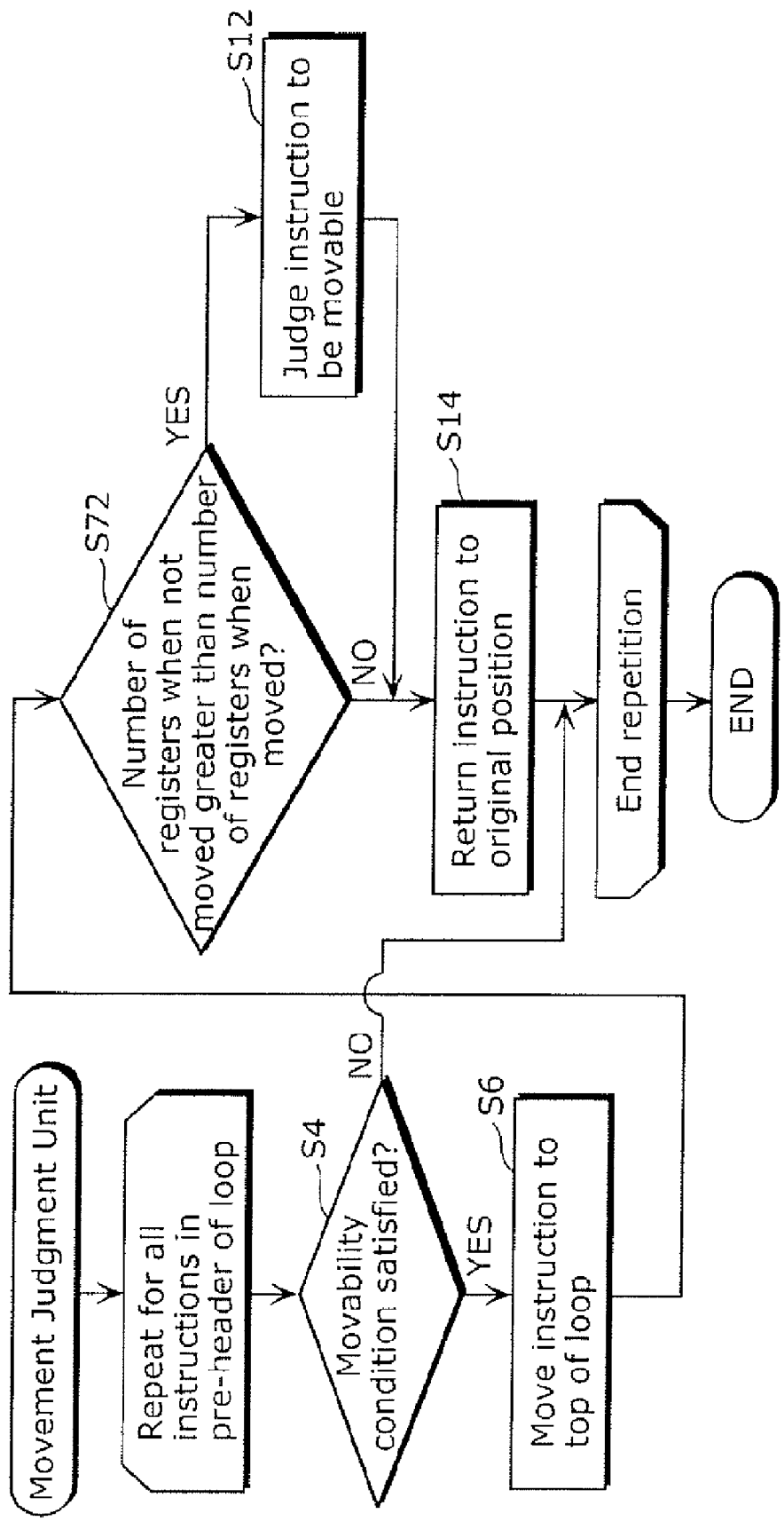
FIG. 22 is a flowchart showing a process executed by a motion judgment unit according to the fifth embodiment of the present invention.

FIG. 22 is a flowchart showing the process performed by the movement judgment unit 152. Instruction scheduling by the instruction scheduling unit 32 has finished by the point in time where the movement judgment unit 152 performs processing. Therefore, instruction scheduling is not performed by the movement judgment unit 152. In other words, in the case where the instruction scheduling has moved an instruction located in the pre-header of the loop and which satisfies the movability condition (MC) to the top of the loop in the intermediate program (S4, S6), the movement judgment unit 152 compares the maximum number of necessary registers after the instruction has been moved with the number of registers necessary when no move is made (S72). In the case where the number of necessary registers after the move is lower than the number of necessary registers when no move is made (YES of S72), the movement judgment unit 152 judges the instruction to be movable (S12).

After the instruction has been judged as movable (512), or in the case where the number of necessary registers after the move is greater than or equal to the number of necessary registers when no move is made (NO of S72), the movement judgment unit 152 returns the instruction moved in the instruction movement process (S6) back to its original position (S14). The movement judgment unit 152 repeats the abovementioned movement judgment processing on all instructions in the pre-header of the loop.

Figure 23:
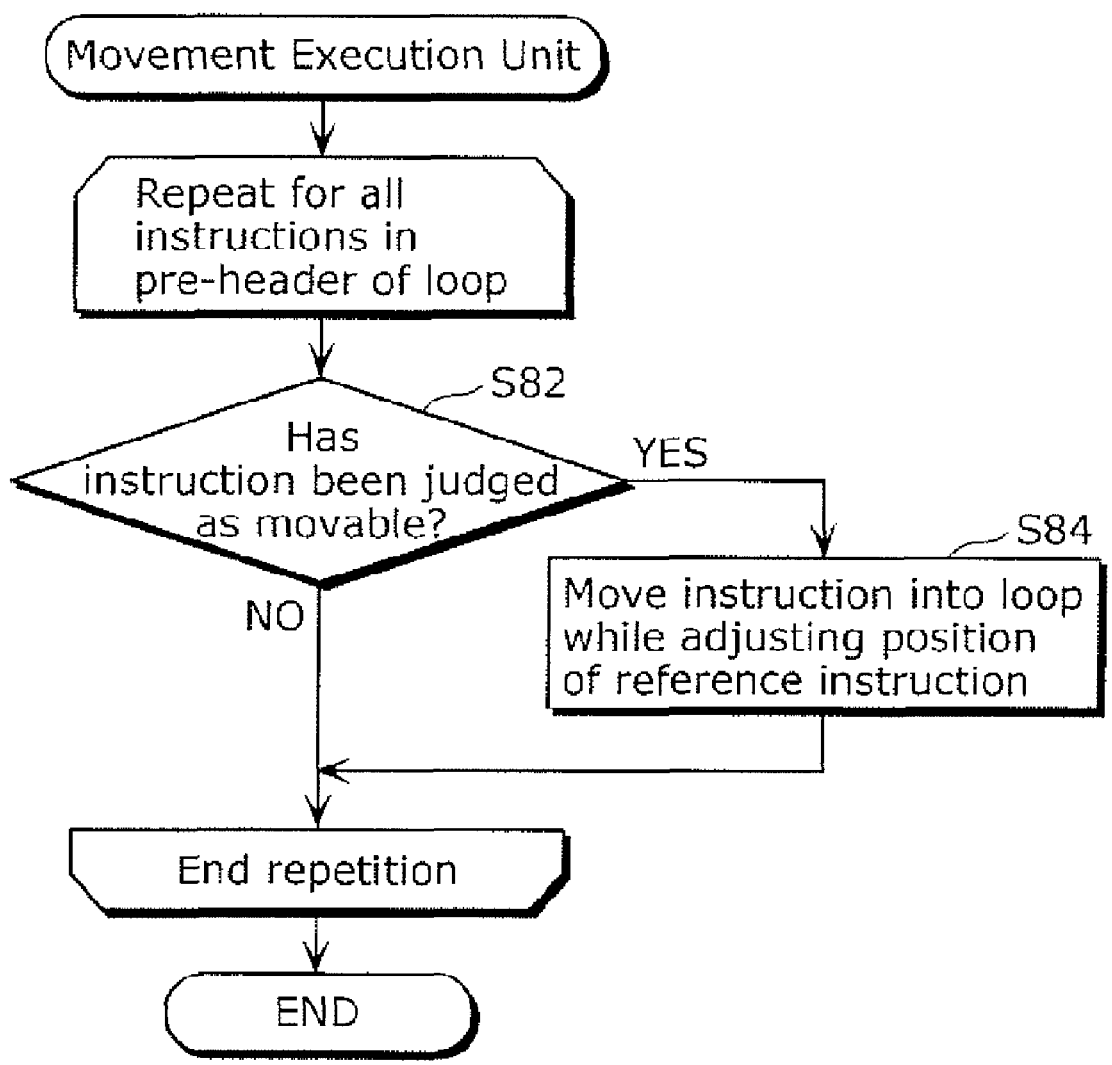
FIG. 23 is a flowchart showing a process executed by a motion execution unit according to the fifth embodiment of the present invention.

FIG. 23 is a flowchart showing the process performed by the movement execution unit 154. Instruction scheduling by the instruction scheduling unit 32 has finished by the point in time where the movement execution unit 154 performs processing. Therefore, when moving the instruction judged to be movable (YES of S82), the instruction scheduling unit 32 performs scheduling while adjusting the positions of instructions data-dependent on the instruction judged to be movable (SB4). Thus, the movement execution unit 154 moves the instruction into the loop so that the data-dependency is not disturbed.

As described above, with the compiler according to the present embodiment, the number of registers necessary in the loop can, as in the previous embodiments, be reduced. However, the compiler of the present embodiment can achieve this even after an instruction has been scheduled by moving the instruction into the loop so as not to disturb the data-dependency on the movable instruction. Therefore, it is possible to increase the number of registers usable when the loop is executed. Thus, the probability of the occurrence of register spilling can be reduced. In addition, the live range of registers can be shortened by moving instructions into the loop. Therefore, the probability of using a backup register drops, thus reducing the probability of executing code for saving/returning values held in the backup register to/from a stack. Therefore, the possibility of decreasing the performance of the loop by causing unnecessary register spilling or through the execution of save/return code is eliminated. Hence, the performance of the loop can be improved.

Sixth Embodiment

Next, a compiler according to the sixth embodiment of the present invention shall be described.

The compiler according to the present embodiment differs from the compilers according to the abovementioned first through fifth embodiments in that movement judgment processing and movement execution processing are performed after instruction scheduling and register allocation.

Figure 24:
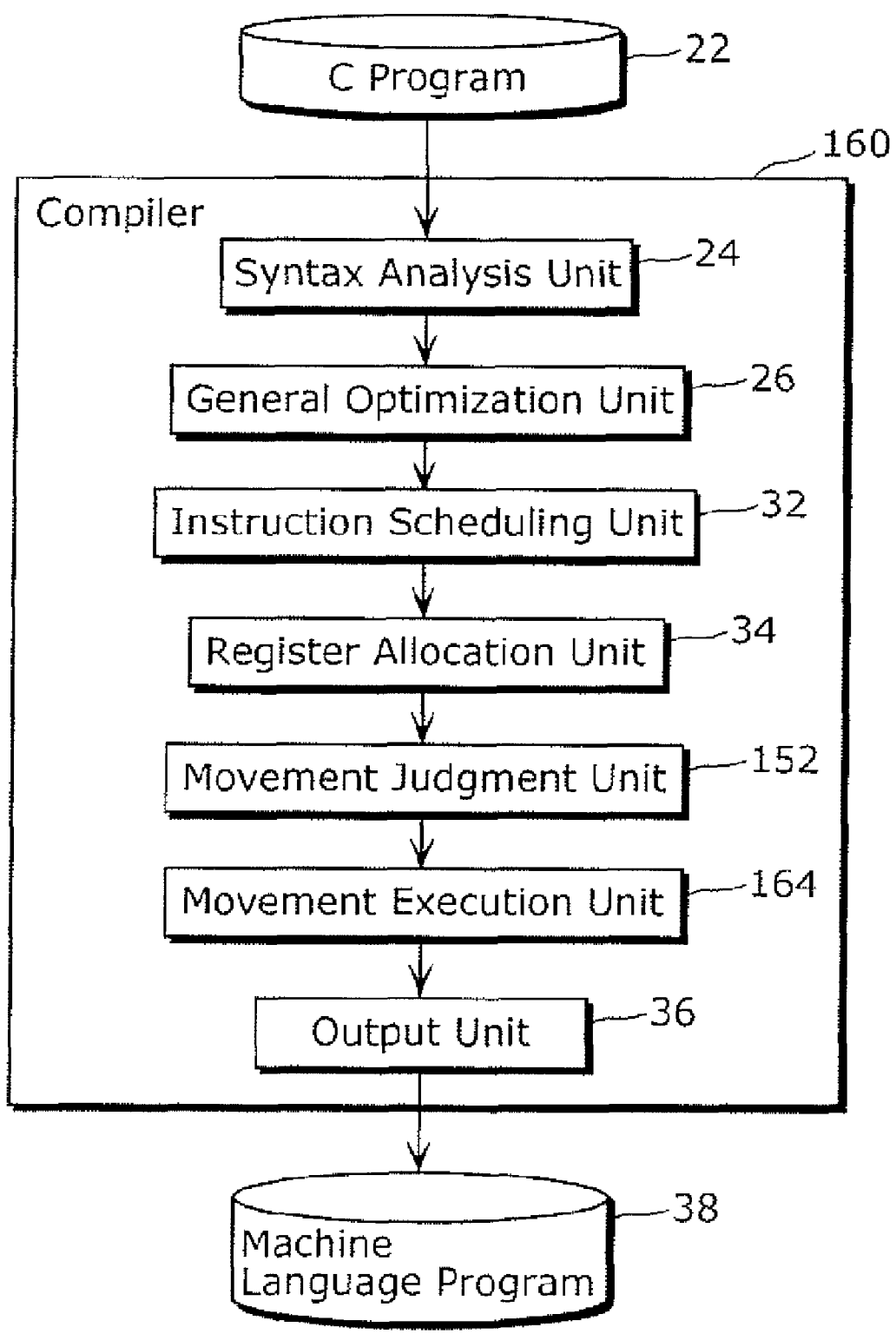
FIG. 24 is a block diagram that functionally shows a configuration of a compiler according to the sixth embodiment of the present invention.

FIG. 24 is a block diagram that functionally shows a configuration of a compiler according to the present embodiment. The compiler 160 is computer software, the target processor of which can execute three instructions in parallel, that translates a source program written in high-level language to a machine language program, and functionally includes a syntax analysis unit 24, a general optimization unit 26, an instruction scheduling unit 32, a register allocation unit 34, a movement judgment unit 152, a movement execution unit 164, and an output unit 36.

Processing units aside from the movement judgment unit 152 and the movement execution unit 164 are the same as those described in the first embodiment. The movement judgment unit 152 is identical to that described in the fifth embodiment. Thus, detailed descriptions of these processing units shall not be repeated here.

The movement execution unit 164 is a processing unit which moves an instruction judged as movable by the movement judgment unit 152, from among the instructions included in the intermediate program on which instruction scheduling and register allocation has finished, into the loop. Descriptions of processes performed by the movement execution unit 164 shall be given hereafter.

Figure 25:
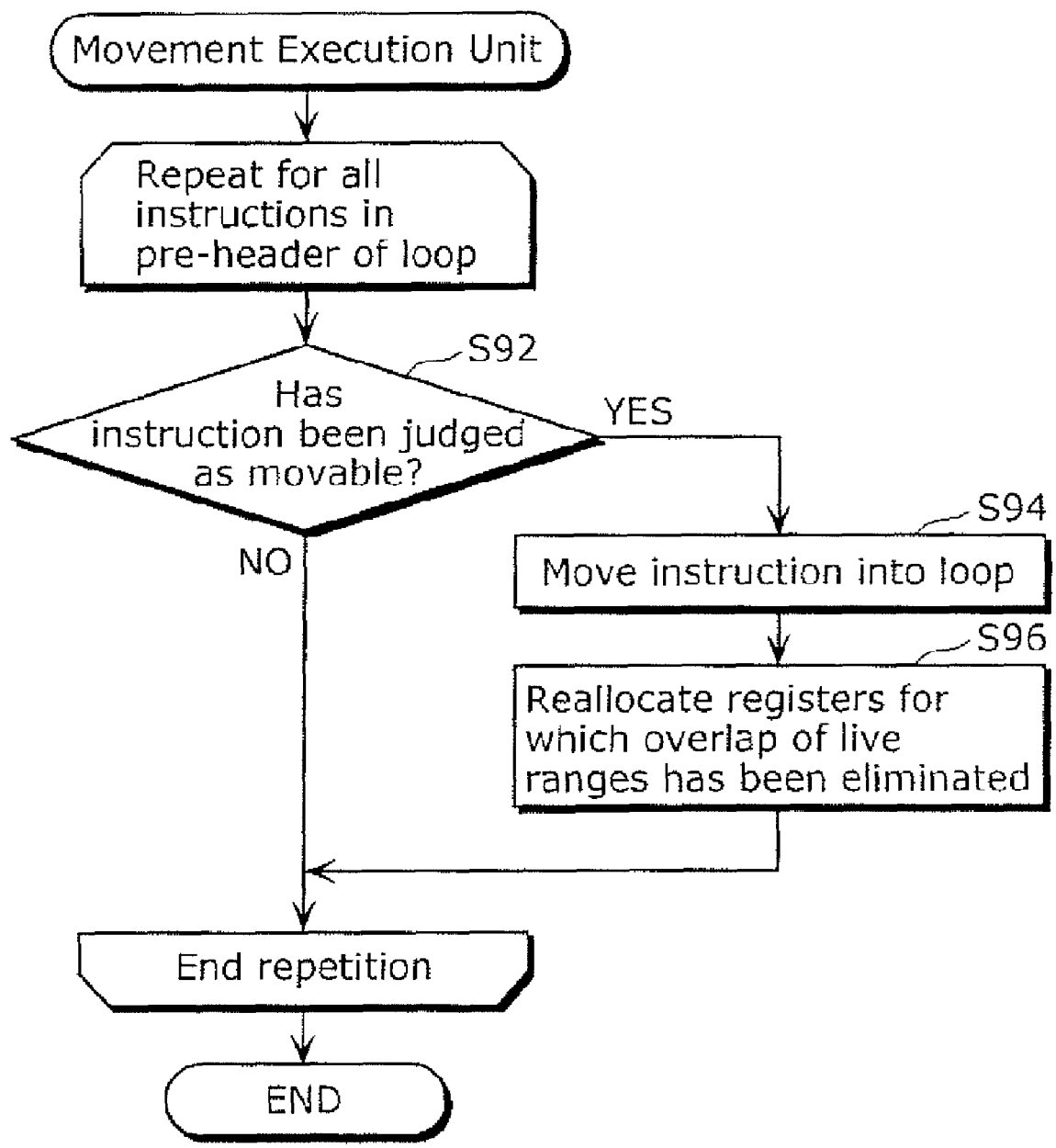
FIG. 25 is a flowchart showing a process executed by a motion execution unit according to the fifth embodiment of the present invention.

FIG. 25 is a flowchart showing the process performed by the movement execution unit 164. The movement execution unit 164 examines whether or not there is present an instruction, among the instructions in the pre-header of the loop, that has been judged to be movable into the loop by the movement judgment unit 152 (S92). In the case where there is present an instruction movable into the loop (YES of S92), the movement execution unit 164 moves the instruction into the loop (S94). Then, for the registers in which overlapping of live ranges has been eliminated through the instruction being moved, the movement execution unit 164 reallocates those registers (S96). Through this processing, the movement execution unit 164 can reduce the number of registers used.

FIGS. 26A and 26B are diagrams showing a reduction in the number of registers as a result of an instruction being moved. FIG. 26A is a diagram showing an example of an intermediate program 170 before processing is performed by the movement execution unit 164, and FIG. 26B is a diagram showing an example of an intermediate program 176 after processing is performed by the movement execution unit 164.

In FIGS. 26A and 26B, the case shown is that in which a mov instruction 172 present in the intermediate program 170 is moved into the loop; in the intermediate program 170, the live ranges of the registers r3 and r5 overlap, but this overlap is eliminated by moving the mov instruction 172 into the loop. Thus, the register r5 can be reallocated to the register r3. In other words, the mov instruction 172 and add instruction 174 of the intermediate program 170 are respectively changed to the mov instruction 178 and add instruction 180 of the intermediate program 176, thereby reducing the number of registers by one.

As described above, with the compiler according to the present embodiment, the number of registers necessary in the loop can, as in the previous embodiments, be reduced. However, the compiler of the present embodiment can achieve this even after instruction scheduling and register allocation have finished by moving the instruction into the loop. Moreover, the number of registers used can be reduced even in the case where overlap in the live ranges of registers has been eliminated.

Therefore, it is possible to increase the number of registers usable when the loop is executed. Thus, the probability of the occurrence of register spilling can be reduced. In addition, the live range of registers can be shortened by moving instructions into the loop. Therefore, the probability of using a backup register drops, thus reducing the probability of executing code for saving/returning values held in the backup register to/from a stack. Therefore, the possibility of decreasing the performance of the loop by causing unnecessary register spilling or through the execution of save/return code is eliminated. Hence, the performance of the loop can be improved.

The compiler of the present invention has hereby been described according to the first through the sixth embodiments, but the present invention is not intended to be limited to the embodiments described herein.

For example, the movement judgment unit 28 of the third embodiment judges whether or not an instruction that is data-dependent on an instruction moved into the loop is movable into the loop based on the number of necessary registers; however, whether or not the instruction is movable into the loop may be judged using a method for performing movement judgment on an instruction as described in another embodiment.

In addition, in the above embodiments, register allocation is performed by the register allocation unit 34 after instruction scheduling is performed by the instruction scheduling unit 32; however, the instruction scheduling may be performed after the register allocation. Also, instruction scheduling and register allocation may be performed multiple times.

In addition, the same movement judgment processing and movement execution processing are possible even when optimization, such as software pipelining that causes multiple iterations to overlap, is performed in the loop.

Furthermore, the place to search for instructions at the time of movement judgment is not limited to the pre-header of the loop; the instruction may be considered for movement judgment as long as the reaching definition for the loop is unique.

Further still, concerning multiple nested loops, movement judgment processing and movement execution processing may be repeatedly performed on an instruction so as to reach the innermost loop possible, preferably reaching the innermost loop. FIGS. 27A and 27B are diagrams illustrating movement judgment and movement execution processing of an instruction within nested loops. An intermediate program 190 such as that shown in FIG. 27A, which includes one loop nested within another, can be considered. In other words, the intermediate program 190 has an outermost loop (the loop indicated by the label L00002) in which an innermost loop (the loop indicated by the label L00001) is nested. In the case where the compiler has judged whether or not a mov instruction 192, which is the pre-header of the outermost loop in the intermediate program 190, is movable into the outermost loop, and judges that the mov instruction 192 is movable, the compiler moves the mov instruction 192 into the outermost loop; the mov instruction 192 remains outside of the innermost loop. Next, the compiler judges whether or not the mov instruction 192 is movable into the innermost loop, and in the case where the mov instruction 192 is movable, the compiler moves the mov instruction into the innermost loop. FIG. 27B is a diagram showing an example of an intermediate program 194 after the mov instruction 192 has been moved into the innermost loop.

In addition, the compiler may expand the movability condition (MC) in the manner described hereafter. That is, even if the definition of a virtual register in an instruction is not unique, in the case where another definition of the virtual register is present below the pre-header of the instruction or is not present within the loop, the movability condition (MC) can be expanded so as to consider that definition to be a unique definition.

Furthermore, in the above embodiments, instruction movement judgment is performed with emphasis placed on register resources; however, instruction movement judgment may be performed based on memory resources such as a condition flag.

In addition, the optimization processing described in the above embodiments may be performed based on a directive given to the compiler by a user. That is, the optimization process of the compiler can be directed using a compiler option, a pragma, or the like.

FIGS. 28A through 28E are diagrams that describe direction of the optimization process for a compiler. FIG. 28A is a diagram showing an example of a source program that includes a pragma "# pragma invariant_reverse" which directs a compiler to optimize a loop through instruction movement. In a source program 200, the compiler optimizes the loop through the abovementioned instruction movement, the target loop being a for loop directed by the pragma "# pragma invariant_reverse".

FIG. 28B is a diagram showing an example of a source program that includes a pragma "# pragma invariant_reverse_off" which directs a compiler not to optimize a loop through instruction movement. In a source program 202, the compiler does not optimize the loop through the abovementioned instruction movement, the target loop being a for loop directed by the pragma "# pragma invariant_reverse_off".

FIG. 28C is a diagram showing a compile option "-invariant_reverse" which directs a compiler to optimize a loop through instruction movement. That is, when compiling a source program, the user inputs an instruction "cc" for starting the compiler, and the file name of the source program "test.c", in the command line, and can input a compile option "-invariant_reverse" as well. Through this, the compiler optimizes the loop through the abovementioned instruction movement, the target loop being a loop contained in the source program with the file name "test.c".

FIG. 28D is a diagram showing a compile option "-invariant_reverse_off" which directs a compiler not to optimize a loop through instruction movement. That is, when compiling a source program, the user inputs an instruction "cc" for starting the compiler, and the file name of the source program "test.c", in the command line, and may input a compile option "-invariant_reverse_off" as well. Through this, the compiler does not optimize the loop through the abovementioned instruction movement, the target loop being a loop contained in the source program with the file name "test.c".

By using the pragma shown in FIG. 28A or the compiler option shown in FIG. 28C, the compiler can generate a machine language program in which the number of registers can be reduced.

On the other hand, by using the pragma shown in FIG. 28B or the compiler option shown in FIG. 28D, the compiler can generate a machine language program in which the number of instructions for executing the loop can be reduced. Therefore, such directives for a compiler are effective in the case where low power consumption is desired when executing a machine language program.

Note here that FIG. 28E is a diagram showing a compile option "-low_power_mode" which directs a compiler to generate a machine language program executable with a low amount of power consumption. That is, when compiling a source program, the user inputs an instruction "cc" for starting the compiler, and the file name of the source program "test.c", in the command line, and can input a compile option "-low_power_mode" as well. Through this, the compiler does not optimize the loop through instruction movement, in the same manner as FIG. 28D, in which the directive is performed via a compiler option. Accordingly, as shown in FIGS. 28A to 28D, the compiler is not directly instructed to or instructed not to optimize the loop; rather, the compiler can be indirectly instructed to or instructed not to optimize the loop, as can be seen in FIG. 28E.

Moreover, the movement judgment unit 28 may judge whether or not to move an instruction into a loop by comparing (i) the number of run cycles of a loop, the loop being in an intermediate program in which instruction scheduling has been performed but the instruction has not yet been moved into the loop (the abovementioned result A) with (ii) the number of run cycles of a loop, the loop being in an intermediate program in which the instruction has been moved into the loop (the abovementioned result B).

In addition, when optimizing a loop by moving an instruction outside of the loop via normal loop invariant motion, movement judgment may be performed in accordance with the state of the live ranges of registers (including virtual registers), as described in the above embodiments.

Figure 29:
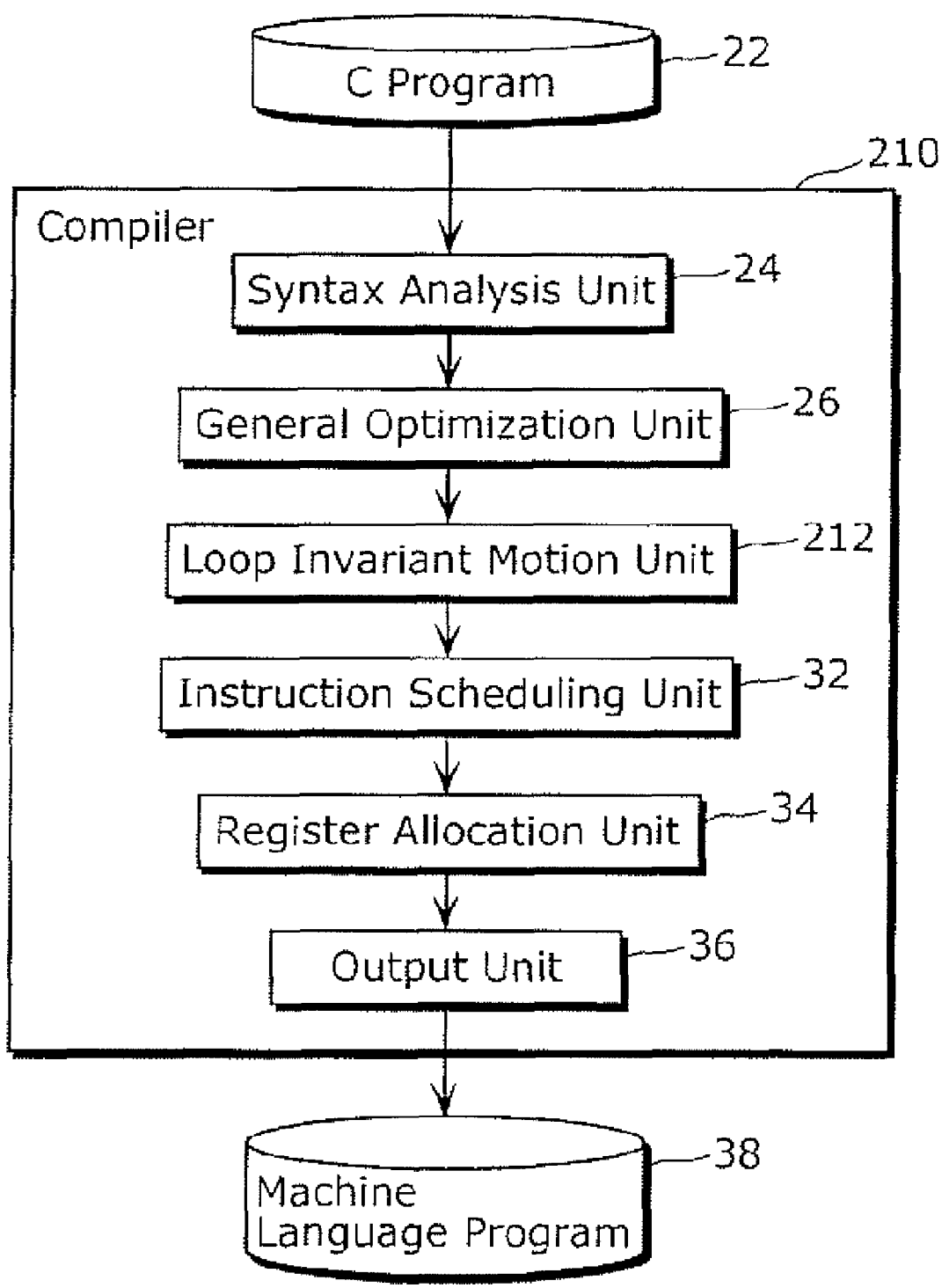
FIG. 29 is a block diagram that functionally shows an example of a configuration of a compiler that performs optimization via loop invariant motion.

FIG. 29 is a block diagram that functionally shows an example of a configuration of a compiler that performs optimization via loop invariant motion. The compiler 210 is computer software that translates a source program written in high-level language to a machine language program, and functionally includes a syntax analysis unit 24, a general optimization unit 26, a loop invariant motion unit 212, an instruction scheduling unit 32, a register allocation unit 34, and an output unit 36.

Processing units aside from the loop invariant motion unit 212 are the same as those described in the first embodiment, and thus detailed descriptions of those processing units shall not be repeated here. The loop invariant motion unit 212 is a processing unit that performs optimization via loop invariant motion on an intermediate program.

Figure 30:
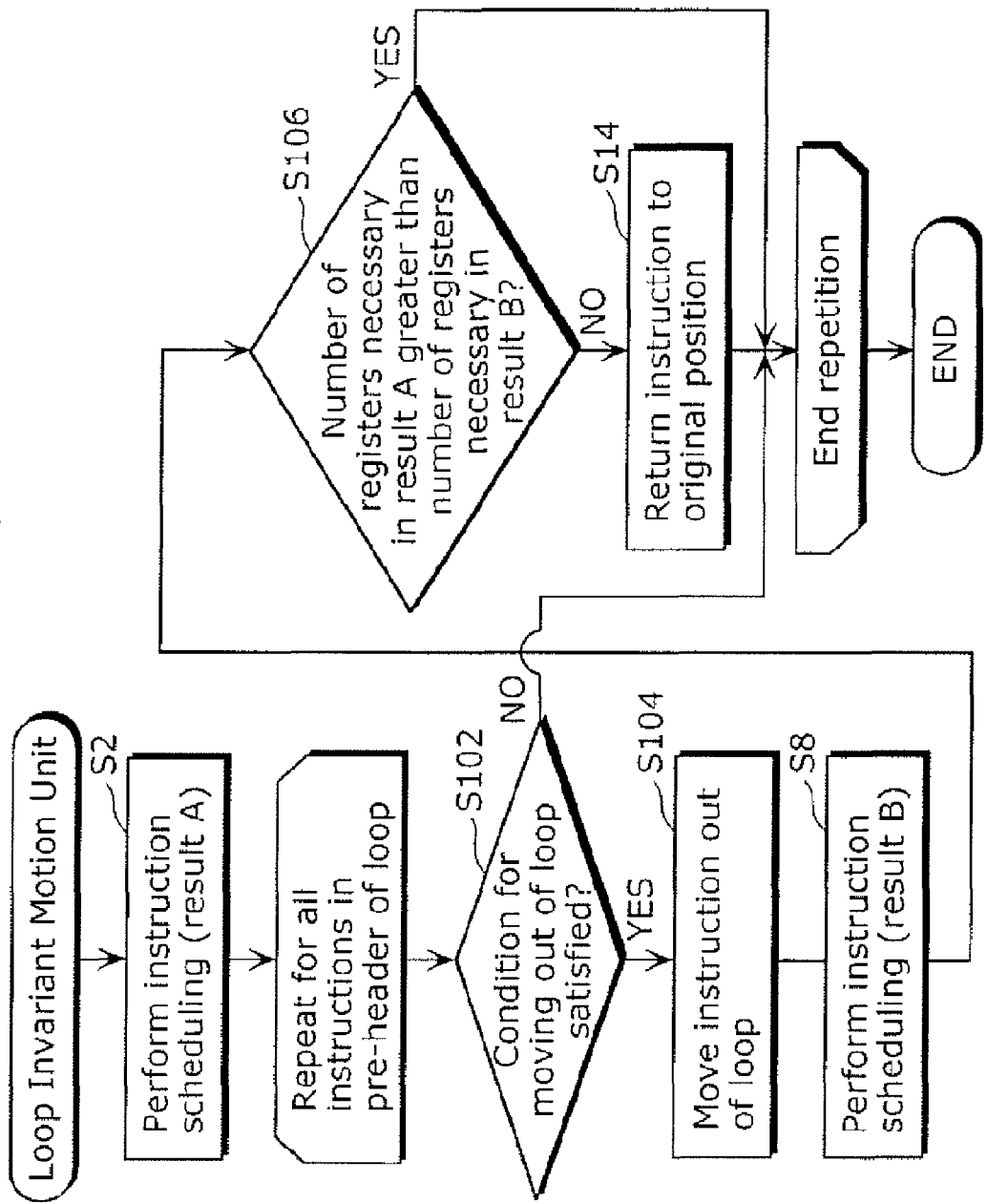
FIG. 30 is a flowchart showing a process executed by a loop invariant motion unit.

FIG. 30 is a flowchart showing a process executed by the loop invariant motion unit 212. The loop invariant motion unit 212 performs instruction scheduling on the inputted intermediate program; the result of this instruction scheduling is a result A (S2). Next, the loop invariant motion unit 212 repeats the following processing on all instructions in the loop. That is, the loop invariant motion unit 212 judges whether or not a target instruction satisfies a movability condition for movement to outside of the loop (S102). This movability condition is generally-known technology and therefore detailed descriptions shall not be repeated here. In the case where the movability condition is satisfied (YES of S102), the loop invariant motion unit 212 moves the instruction out of the loop (S104). Next, the loop invariant motion unit 212 performs instruction scheduling on the intermediate program after the instruction has been moved; the result of this instruction scheduling is a result B (S8). After that, in the case where the number of registers necessary in the result B is greater than the number of registers necessary in the result A (NO of S106), the loop invariant motion unit 212 judges that the number of necessary registers will not be reduced even if the instruction is moved outside of the loop. Therefore, the loop invariant motion unit 212 returns the instruction moved out of the loop in the instruction movement process (S104) to its original position (S14).

By performing the above processing, it is possible to perform loop invariant motion only in cases where the necessary number of registers will decrease if loop invariant motion is performed. Note that the judgment of whether or not to perform loop invariant motion is not limited to comparing the number of necessary registers; the judgment may be performed through a method described in the above embodiments, such as comparing occurrences of register spilling.

Furthermore, the program inputted into the compiler is nut limited to a C program; the inputted program may be another high-level language program, or may be an actual assembly program itself.

Also, the program outputted by the compiler is not limited to a machine language program; an assembly program may be outputted as well.

In addition, the embodiments of the present invention provide descriptions regarding a compiler; however, the present invention may be used as a connection tool between an assembler and a linker Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable in a compiler, and particularly in a compiler inputted with a program containing a loop.

What is claimed is:

1. A compiler apparatus which translates a first program that includes a loop into a second program, comprising:
    a movement judger, included in a computer, operable to judge whether or not an instruction that is positioned outside of the loop of the first program can be moved into the loop, based on a state of live ranges of variables used in the instruction;
    a movement executor, included in the computer, operable to move the instruction into the loop when said movement judger judges that the instruction can be moved into the loop, thereby generating an intermediate program; and a translator, included in the computer, operable to translate the intermediate program into the second program.

2. The compiler apparatus according to claim 1, wherein said movement judger is operable to judge whether or not an instruction positioned outside of the loop of the first program can be moved into the loop by comparing the state of live ranges of variables before the instruction is moved into the loop with a hypothetical state of the live ranges of the variables after the instruction is moved into the loop.

3. The compiler apparatus according to claim 1, wherein said movement judger is operable to judge that the instruction can be moved into the loop when the number of registers necessary after moving the instruction is less than the number of registers necessary before moving the instruction.

4. The compiler apparatus according to claim 1, wherein said movement judger is operable to judge that the instruction can be moved into the loop when the number of occurrences of register spilling after moving the instruction is less than the number of occurrences of register spilling before moving the instruction.

5. The compiler apparatus according to claim 1, wherein said movement judger is operable to judge that the instruction can be moved into the loop when a live start number, which is the number of variables in which the instruction starts live ranges, is greater than a live end number, which is the number of variables in which the instruction ends live ranges.

6. The compiler apparatus according to claim 1, wherein said movement judger is operable to judge the instruction to be movable into the loop when the number of variables in the instruction with a value defined is greater than the number of variables in the instruction with values that are referred to.

7. The compiler apparatus according to claim 1, wherein said movement judger is operable to judge that the instruction can be moved into the loop when the number of run cycles of the loop when the instruction is moved into the loop is less than the number of run cycles of the loop when the instruction is not moved into the loop.

8. The compiler apparatus according to claim 1, wherein said movement judger is further operable to judge whether or not an instruction which is outside the loop, and which is data-dependent on the instruction judged to be movable into the loop, can be moved into the loop.

9. The compiler apparatus according to claim 1, wherein the loop has a structure in which plural loops are nested, and said movement judger is operable to judge whether or not the current instruction can be moved into a subsequent nested loop, moving toward the innermost loop.

10. The compiler apparatus according to claim 1, wherein when moving, into the loop, a first instruction judged by said movement judger to be movable into the loop, said movement executor moves a second instruction that is data-dependent on the first instruction to a position where the data dependency is not disturbed.

11. The compiler apparatus according to claim 1, wherein when overlap of the live ranges of a first register used by the instruction and a second register is eliminated as a result of moving, into the loop, an instruction judged to be movable by said movement judger, said movement executor is further operable to reallocate the second register to a different register.

12. The compiler apparatus according to claim 1, further comprising a direction acquirer operable to acquire a direction regarding whether or not to move an instruction, wherein said movement judger is further operable to not to judge whether or not to move the instruction into the loop when said direction acquirer acquires a direction not to move the instruction.

13. The compiler apparatus according to claim 12, wherein the direction is a compile option supplied when the compiler apparatus is started.

14. The compiler apparatus according to claim 12, wherein the direction is a pragma described in the first program.

15. The compiler apparatus according to claim 1, further comprising a direction acquirer operable to acquire a direction regarding whether or not to move an instruction, wherein said movement judger is further operable to judge whether or not to move the instruction into the loop when said direction acquirer acquires a direction to move the instruction.

16. The compiler apparatus according to claim 1, further comprising a direction acquirer operable to acquire a direction regarding whether or not to translate the first program into the second program for low power consumption, wherein said movement judger is further operable not to judge whether or not to move an instruction when said order direction acquirer acquires a direction to translate the first program into the second program for low power consumption.

17. A compiler apparatus which translates a first program that includes a loop into a second program, comprising:

a loop invariant motion unit, included within a computer, operable to selectively optimize an instruction positioned within the loop contained in the first program through loop invariant motion, in accordance with a state of live ranges of variables used by the instruction, and generate an intermediate program; and a translator, included within the computer, operable to translate the intermediate program into the second program, wherein said loop invariant motion unit is operable to optimize the instruction through the loop invariant motion when the number of registers necessary after the instruction is moved is less than the number of registers necessary before the instruction is moved.

18. A computer-implemented compiling method for translating a first program that includes a loop into a second program, comprising:

judging, by a computer, whether or not an instruction which is positioned outside of the loop of the first program can be moved into the loop, based on a state of live ranges of variables used in the instruction;

moving, by the computer, the instruction into the loop when it is judged in the judging that the instruction can be moved into the loop, thereby generating an intermediate program; and translating, by the computer, the intermediate program into the second program.

19. A tangible computer readable recording medium storing a compiler program for translating a first program that includes a loop into a second program, the computer program causing a computer to perform:

judging whether or not an instruction which is positioned outside of the loop of the first program can be moved into the loop, based on a state of live ranges of variables used in the instruction;

moving the instruction into the loop when it is judged in the judging that the instruction can be moved into the loop, thereby generating an intermediate program; and translating the intermediate program into the second program.

\* \* \* \* \*